United States Patent
Uchida

(10) Patent No.: US 10,735,399 B2
(45) Date of Patent: Aug. 4, 2020

(54) SYSTEM, SERVICE PROVIDING APPARATUS, CONTROL METHOD FOR SYSTEM, AND STORAGE MEDIUM

(71) Applicant: CANON KABUSHIKI KAISHA, Tokyo (JP)

(72) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 15/728,404

(22) Filed: Oct. 9, 2017

(65) Prior Publication Data
US 2018/0109515 A1   Apr. 19, 2018

(30) Foreign Application Priority Data

Oct. 13, 2016 (JP) ................. 2016-201635

(51) Int. Cl.
*H04L 29/06* (2006.01)
(52) U.S. Cl.
CPC ........ *H04L 63/0815* (2013.01); *H04L 63/083* (2013.01)
(58) Field of Classification Search
CPC ................. H04L 63/0815; H04L 63/083
See application file for complete search history.

(56) References Cited

U.S. PATENT DOCUMENTS 9,503,452 B1 * 11/2016 Kumar .................. H04L 67/306
9,774,586 B1 *  9/2017 Roche .................... H04L 63/08

FOREIGN PATENT DOCUMENTS

JP         2005-301424 A      10/2005
WO    WO-2015022090 A1 *  2/2015 ........... H04L 63/102

OTHER PUBLICATIONS

Leandro, Marcos et al. "Multi-Tenancy Authorization System with Federated Identity for Cloud-Based Environments Using Shibboleth", ICN2012 The 11th International Conference on Networks, Feb. 29-Mar. 5, 2012 (Year: 2012).*

* cited by examiner

*Primary Examiner* — Noura Zoubair
(74) *Attorney, Agent, or Firm* — Canon U.S.A., Inc. IP Division

(57) ABSTRACT

A client terminal includes a first acquisition unit configured to acquire, in response to a user, who has received a service provided by the second service providing apparatus, issuing an instruction for requesting provision of a service by a first service providing apparatus, information indicating a tenant of the first service providing apparatus associated with a community to which the user belongs.

7 Claims, 20 Drawing Sheets

| COMPANY ID | COMMUNITY ID |
|---|---|
| 1002AA | |
| 1003AA | communityId1 |
| 1004AA | communityId2 |
| ⋮ | ⋮ |

FIG.9

| BUTTON SETTING | |
|---|---|
| DISPLAY NAME | DOCUMENT CREATION |
| OPERATION | EXECUTE JavaScript |
| CONTENT | `var mainForm = document.createElement("form");`<br>`mainForm.action = "http://service_a/service";`<br>`mainForm.method = "GET";`<br>`document.body.appendChild(mainForm);`<br><br>`var tid = document.createElement("input");`<br>`tid.name = "TENANT_ID";`<br>`tid.value = <ACQUIRE COMPANY ID>;`<br>`mainForm.appendChild(tid);`<br><br>`var sid = document.createElement("input");`<br>`sid.name = "sessionid";`<br>`sid.value = "{!$Api.Session_Id}";`<br>`mainForm.appendChild(sid);`<br><br>`var url = document.createElement("input");`<br>`url.name = "serverurl";`<br>`url.value = "{!$Api.Server_URL}";`<br>`mainForm.appendChild(url);`<br><br>`var rid = document.createElement("input");`<br>`rid.name = "recordid";`<br>`rid.value = "{!Opportunity.Id}";`<br>`mainForm.appendChild(rid);`<br>`}`<br><br>`var sub = window.open("about:blank", "serviceA");`<br>`mainForm.submit();`<br>`}` |

901 — DISPLAY NAME
902 — OPERATION
903 — CONTENT

SYSTEM, SERVICE PROVIDING APPARATUS, CONTROL METHOD FOR SYSTEM, AND STORAGE MEDIUM

BACKGROUND OF THE INVENTION

Field of the Invention

The present invention relates to a service providing system, a service providing apparatus, a control method for a system, and a storage medium.

Description of the Related Art

A form in which management of work data and various kinds of processing are performed on a cloud platform service has started to become widespread. A user accesses a web page of the cloud platform service from a web browser (hereinafter referred to as a browser) on a client computer (hereinafter referred to as a client personal computer (PC)) via the Internet, and causes display of a screen including work data that the user desires to view on the web page. When the user provides a document creation instruction on the displayed screen, the document creation instruction is redirected to a document generation service. The document generation service then acquires work data present in the cloud platform service to generate a document. The document generation service then transmits the document to the client PC or the cloud platform service. A representative example of the cloud platform service is Salesforce.com (registered trademark) of Salesforce.com, inc.

The cloud platform service and the document generation service operate in a multi-tenant architecture. A tenant is a unit representing a company or an organization that has made a contract to use the cloud platform service and the document generation service. A service operating in the multi-tenant architecture manages data of a plurality of tenants by using a single system in such a way as to separate data of each tenant so that one tenant cannot refer to data of other tenants. The cloud platform service and the document generation service perform user authentication so as to permit the user to refer to only the data of the user's own tenant.

It is conceivable that, in a case where the cloud platform service and the document generation service cooperate with each other, authentication may be performed between the services in cooperation with each other, without an authentication process to be performed by the user in each of the services. As a technique for allowing authentication to be performed among a plurality of services in cooperation with one another, there is, for example, a method for performing single sign-on (hereinafter referred to as SSO) based on Security Assertion Markup Language (SAML). Japanese Patent Application Laid-Open No. 2005-301424 discusses a method for performing SSO based on SAML in a plurality of authentication servers.

SUMMARY OF THE INVENTION

According to embodiments of the present invention, a system includes a client terminal, a first service providing apparatus, and a second service providing apparatus, wherein the first service providing apparatus and the second service providing apparatus cooperate with each other based on single sign-on and a service is provided to the client terminal, wherein the second service providing apparatus includes a management unit configured to manage a tenant of the first service providing apparatus in association with a community created as a subordinate group of a tenant of the second service providing apparatus, wherein the client terminal includes a first acquisition unit configured to acquire, in response to a user, who has received a service provided by the second service providing apparatus, issuing an instruction for requesting provision of a service by the first service providing apparatus, information indicating a tenant of the first service providing apparatus associated with a community to which the user belongs, and a request unit configured to transmit a provision request for providing a service and including the acquired information indicating the tenant of the first service providing apparatus, to the first service providing apparatus, wherein the first service providing apparatus includes a second acquisition unit configured to acquire information indicating a tenant of the first service providing apparatus included in user information associated with an authentication session ID, in a case where access authenticated in the second service providing apparatus is received, a comparison unit configured to perform a comparison between the information indicating the tenant of the first service providing apparatus acquired by the second acquisition unit, and the information indicating the tenant of the first service providing apparatus included in the provision request received from the client terminal, a notifying unit configured to return an error screen to the client terminal, in a case where the pieces of information indicating the respective tenants do not match with each other as a result of the comparison by the comparison unit, and a providing unit configured to provide the service by the first service providing apparatus, in a case where the pieces of information indicating the respective tenants match with each other as a result of the comparison by the comparison unit, and wherein the community, to which the user to receive the service by the second service providing apparatus belongs, is changeable by the client terminal.

Further features of the present invention will become apparent from the following description of exemplary embodiments with reference to the attached drawings.

BRIEF DESCRIPTION OF THE DRAWINGS

FIG. 7 illustrates an example of a company identification (ID) management table.

FIG. 9 is a diagram illustrating an example of button setting.

DESCRIPTION OF THE EMBODIMENTS

Various exemplary embodiments, features, and aspects of the invention will be described in detail below with reference to the drawings.

A cloud platform service and a document generation service each have tenant information, and the tenant information of the cloud platform service and the tenant information of the document generation service are different. In addition, the cloud platform service has a function of switching a certain community to another without logging out, after logging in to this community. Assume that a community of the cloud platform service is switched to another after SSO execution, and then an attempt is made to use the document generation service. In this case, SSO is not performed in a tenant after the switching and therefore, the document generation service operates as a tenant before the switching. The cloud platform service and the document generation service need to recognize each other's tenants, in order for each community of the cloud platform service and the document generation service to perform SSO in the respective tenants different from each other and to separate data of each of the tenants. However, the cloud platform service and the document generation service cannot recognize each other's tenants, even if the method discussed in Japanese Patent Application Laid-Open No. 2005-301424 is used.

Embodiments of the present invention are directed a system that suppresses referring to data of an unintended tenant, in a case where a service is to be received by switching a community of a login destination in which SSO cooperation has been set.

Figure 1:
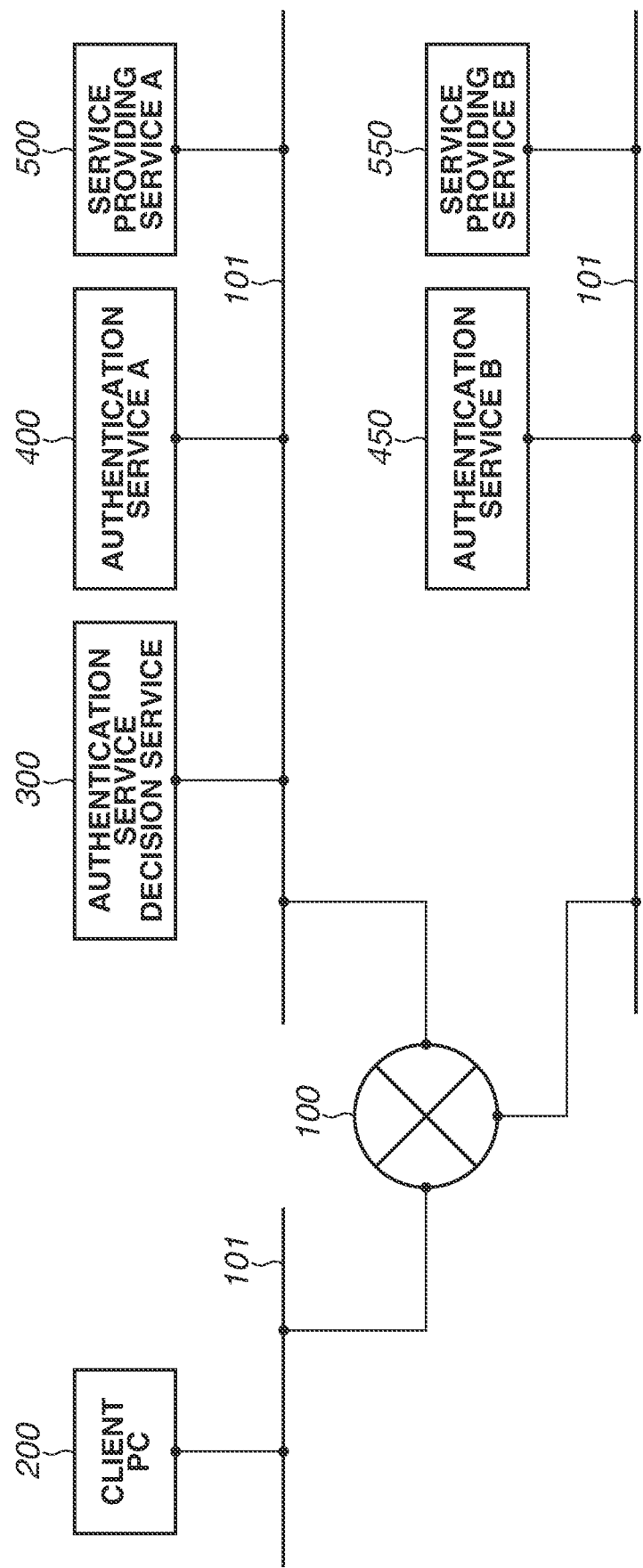
FIG. 1 is a block diagram illustrating a configuration of a system.

FIG. 1 is a block diagram illustrating a system configuration of a first exemplary embodiment of the present invention.

In the present exemplary embodiment, a wide area network (WAN) 100 is provided, and a World Wide Web (WWW) system is implemented. A local area network (LAN) 101 is provided to connect components. The LAN 101 enables apparatuses to communicate with one another via the WAN 100.

A client PC 200 is an information processing apparatus (a client terminal) to be operated by a user. The client PC 200 issues requests to a service providing service A (a first service providing apparatus, hereinafter referred to as a service A) 500, and a service providing service B (a second service providing apparatus, hereinafter referred to as a service B) 550.

An authentication service decision service (hereinafter referred to as a decision service) 300 is provided to guide access of a user to an appropriate authentication service providing apparatus (an identity provider, hereinafter referred to as an IdP or an authentication apparatus).

An authentication service A 400 and an authentication service B 450 each perform authentication, and each operate as the IdP. The number of authentication services is not limited to two. Which IdP actually performs authentication varies depending on the accessed user.

The service A 500 and the service B 550 each provide a service to an authenticated user. In the present exemplary embodiment, the service A 500 generates a document, when receiving a request from the client PC 200. Further, the service B 550 performs processing such as display and update of held data, in response to a request from each of the client PC 200 and the service A 500. The service A 500 and the service B 550 are not limited to the document generation service and the cloud platform service, and may be other services.

In the present exemplary embodiment, the service A 500 and the service B 550 can execute SSO for allowing authentication cooperation between services without authentication by a user in each of the services.

The client PC 200, the decision service 300, the authentication service A 400, the authentication service B 450, the service A 500, and the service B 550 are connected via the WAN 100 and the LAN 101. The client PC 200 and these services may be configured on individual LANs, or may be configured on a single LAN. In addition, the client PC 200 and these services may be configured on a single PC. The decision service 300, the authentication service A 400, and the service A 500 form a server group implemented within a single network (within an intranet). The authentication service B 450 and the service B 550 form a server group implemented within a single network (within an intranet).

The client PC 200 first accesses the service B 550 to receive a service. When receiving unauthenticated user access, the service B 550 displays an authentication screen (not illustrated), and then performs user authentication. Upon completion of the user authentication, the service B 550 displays a screen of work data. The screen of work data displays a button, which is set for redirection to the service A 500. When the button is pressed, the client PC 200 performs the redirection to the service A 500.

When receiving unauthenticated user access, the service A 500 redirects the access to the decision service 300. The decision service 300 redirects the unauthenticated access to an appropriate service, which is the authentication service A 400 or the authentication service B 450. Upon completion of user authentication, the authentication service A 400 or the authentication service B 450 redirects the user to the service A 500 again, and then the service A 500 provides a service to the user.

Figure 2:
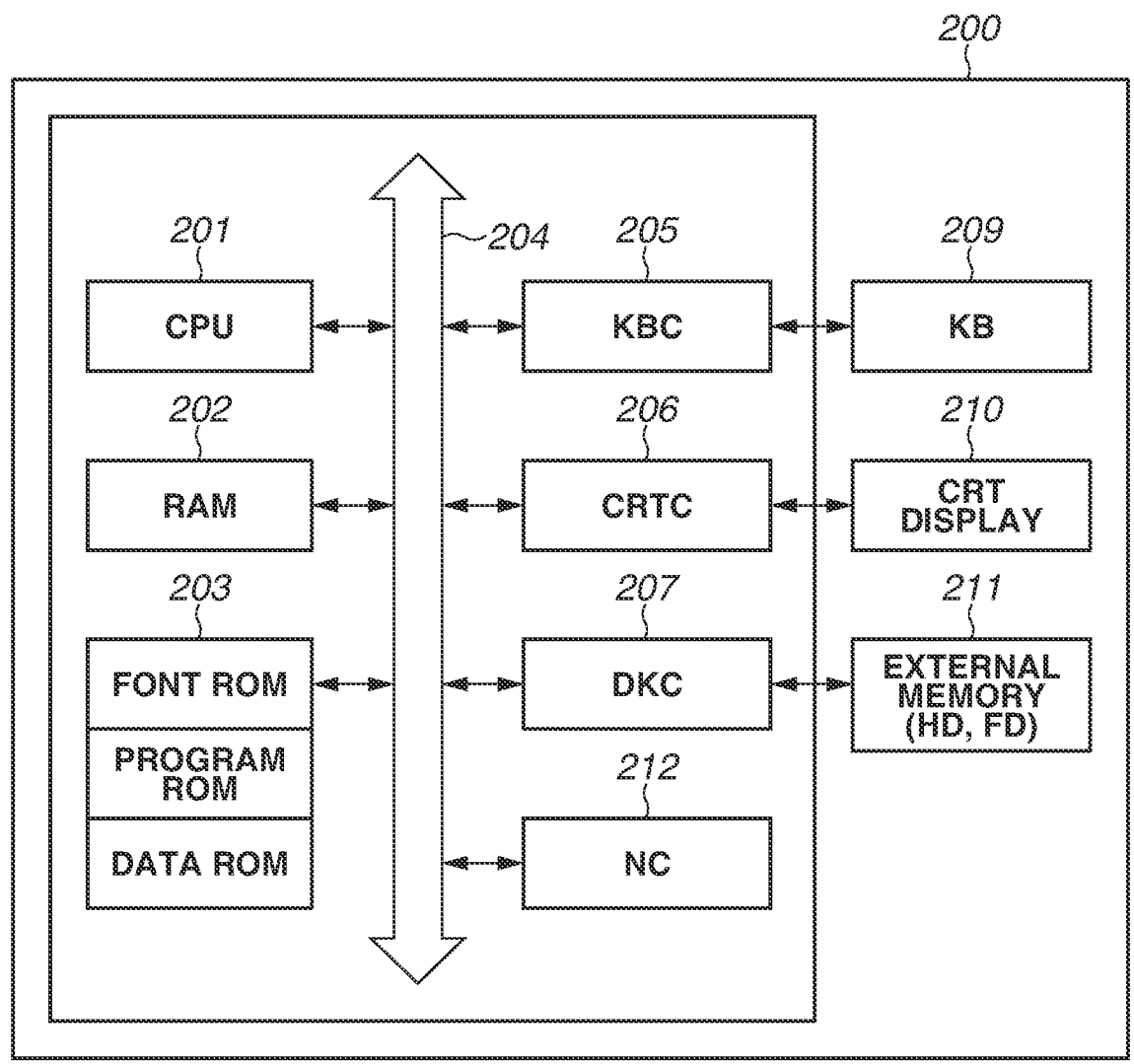
FIG. 2 is a block diagram illustrating a configuration of a client personal computer (PC).

FIG. 2 is a block diagram illustrating a configuration of the client PC 200 according to the present exemplary embodiment.

A server computer, which provides each of the decision service 300, the authentication service A 400, the authentication service B 450, the service A 500, and the service B 550, also has a similar configuration. These services are each configured as a server, and each have a configuration represented by a hardware block diagram illustrated in FIG. 2. In this way, a hardware configuration of an ordinary information processing apparatus is applicable to the client PC 200 and the servers of the present exemplary embodiment.

In FIG. 2, a central processing unit (CPU) 201 executes a program such as an operating system (OS) or an application stored in a program ROM of a read only memory (ROM) 203, or stored in an external memory (a hard disk) 211, by loading the program into a random access memory (RAM) 202. Here, the OS is a program that runs on a computer. Processing in each flowchart to be described below can be implemented by the execution of such a program.

The RAM 202 functions as a main memory and a work area of the CPU 201. A keyboard controller (KBC) 205 controls key inputs from a keyboard (KB) 209 and a pointing device (not illustrated). A cathode ray tube (CRT) controller (CRTC) 206 controls display of a CRT display 210. A disk controller (DKC) 207 controls data access to storage such as the external memory (HD) 211 and a floppy (registered trademark) disk (FD), which stores various data. A network controller (NC) 212 is connected to a network and executes communication control processing for communication with other apparatuses connected to the network.

Throughout the description to be provided below, an executing subject in terms of hardware is the CPU 201, and a subject in terms of software is an application program installed in the hard disk (the external memory 211), unless otherwise specified.

Figure 3A:
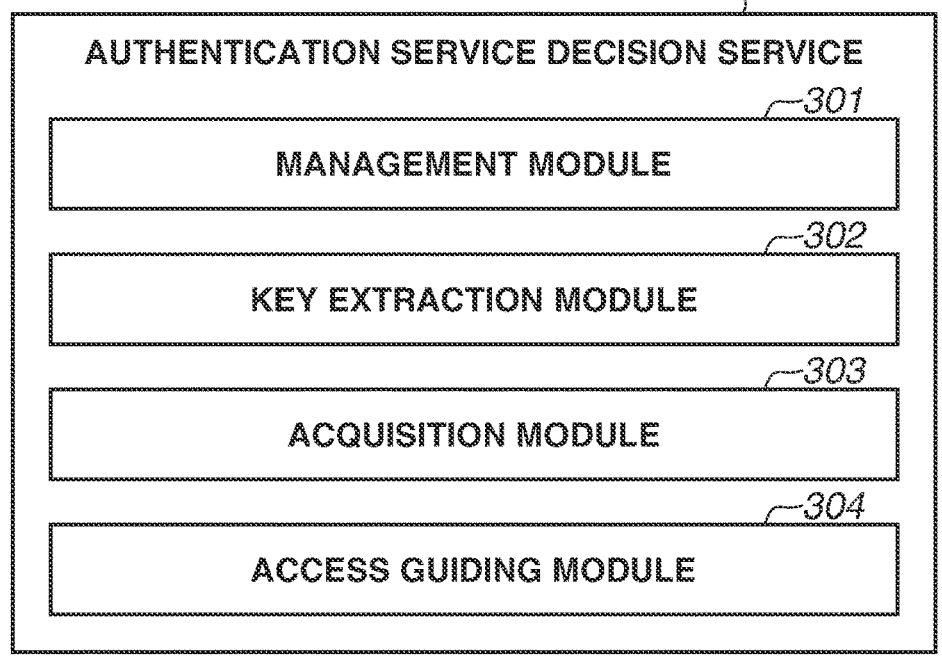
FIGS. 3A, 3B, and 3C are diagrams illustrating a module configuration of an authentication service decision service (a decision service), a module configuration of an authentication service, and a module configuration of another authentication service, respectively.
Figure 3B:
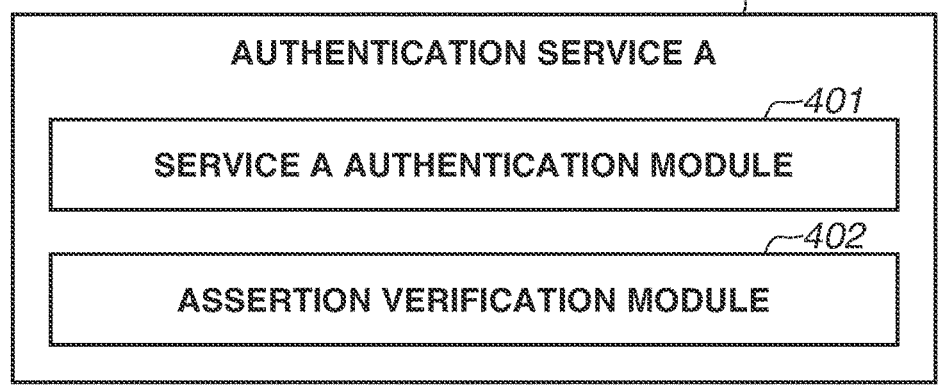
Figure 3C:
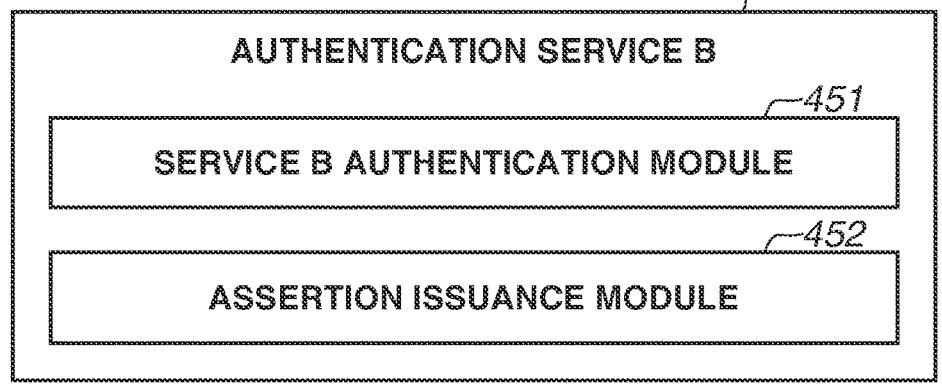

FIGS. 3A, 3B, and 3C each illustrate a module configuration diagram according to the present exemplary embodiment. FIGS. 3A, 3B, and 3C illustrate the decision service 300, the authentication service A 400, and the authentication service B 450, respectively.

FIG. 3A is a diagram illustrating a module configuration of the decision service 300.

The decision service 300 includes a management module 301, a key extraction module 302, an acquisition module 303, and an access guiding module 304. The management module 301 stores information to become a key for deciding an authentication apparatus, and information of the authentication apparatus, and by associating these pieces of information with each other. When the decision service 300 receives access from an unauthenticated user, the key extraction module 302 extracts information to become a key for deciding an authentication apparatus, from information provided at the time of the access by the user. The acquisition module 303 acquires the information of the authentication apparatus from the management module 301, by using the extracted information to become the key. The access guiding module 304 guides the user so that the user accesses an appropriate authentication service, according to the acquired information of the authentication apparatus.

FIG. 3B is a diagram illustrating a module configuration of the authentication service A 400.

Figure 4:
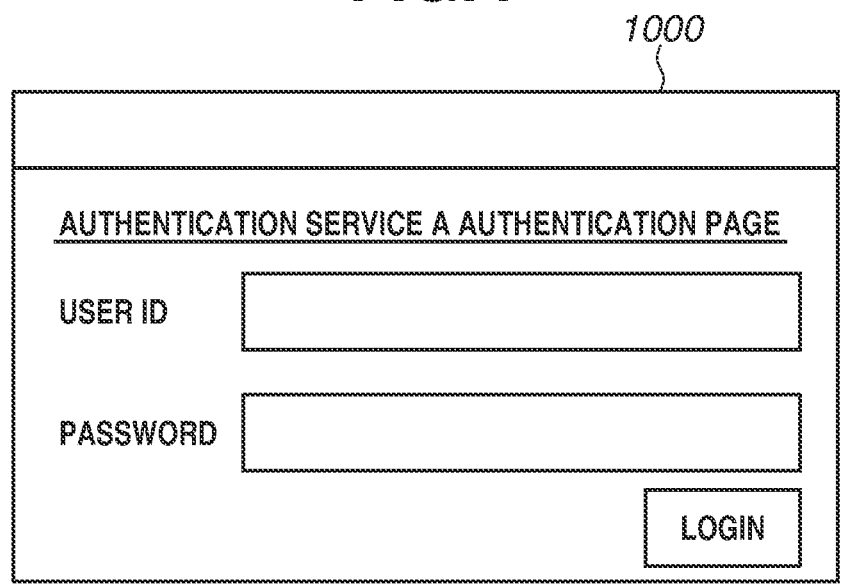
FIG. 4 is a diagram illustrating an example of an authentication screen of a service A.

The authentication service A 400 includes a service A authentication module 401 and an assertion verification module 402. When the authentication service A 400 receives unauthenticated access, the service A authentication module 401 prompts a user to input a user identification (ID) and a password, and authenticates the user ID and the password input by the user. FIG. 4 is a diagram illustrating an authentication screen displayed at the time. The user inputs the user ID and the password into an authentication screen 1000, and then presses a login button. The authentication service A 400 receives evidence of authentication, which is provided by other authentication service to realize SSO, via the access of the user. Then, the assertion verification module 402 verifies the validity of the evidence, namely an authentication result, and decides whether to approve the access of the user.

In the present exemplary embodiment, the information (the evidence of the authentication) serving as the authentication result is assumed to be a SAML assertion. However, SSO of the present exemplary embodiment is not limited to the information using the SAML and SAML assertion. The assertion refers to authentication information issued in response to an authentication result and exchanged between services.

FIG. 3C is a diagram illustrating a module configuration of the authentication service B 450.

The authentication service B 450 includes a service B authentication module 451 and an assertion issuance module 452. When the authentication service B 450 receives unauthenticated access, the service authentication module 451 prompts a user to input a user ID and a password, and authenticates the user ID and the password input by the user. When the authentication is successful, the assertion issuance module 452 generates a SAML assertion to be evidence of the authentication, and redirects the access of the user to an authentication service that can verify the assertion.

Figure 5:
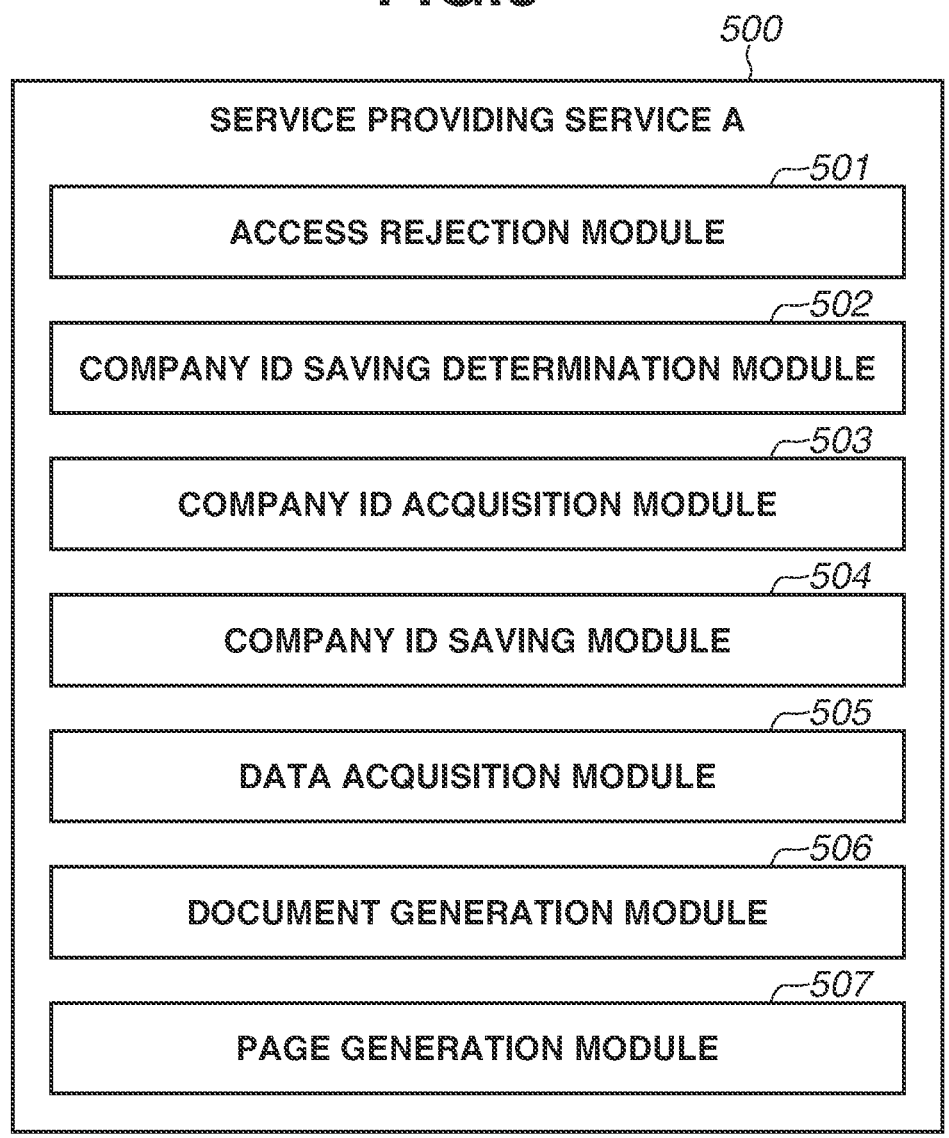
FIG. 5 is a diagram illustrating a module configuration of the service A.

FIG. 5 is a diagram illustrating a module configuration of the service A 500.

The service A 500 includes an access rejection module 501, a company ID saving determination module 502, a company ID acquisition module 503, and a company ID saving module 504. The service A 500 further includes a data acquisition module 505, a document generation module 506, and a page generation module 507.

When the service A 500 receives access from a user, the access rejection module 501 determines whether the access is authenticated. If the access is unauthenticated, the access rejection module 501 redirects the access to the decision service 300. If the access is authenticated, the service A 500 provides the service to the user, by using the document generation module 506.

The company ID saving determination module 502 determines whether a company ID is included in a uniform resource locator (URL) parameter of redirection from the authentication service A 400. The company ID is a piece of belonging information uniquely assigned to an organization or corporation unit that uses this system. The company ID may also be referred to as a tenant ID. For example, assume that a user and a client terminal used by the user belong to one of tenants, so that the tenant to which the user and the tenant belong can be uniquely identified. Here, pieces of information, in which a URL that is location information of an access destination includes various kinds of attribute information (setting values), are collectively described as a URL parameter.

In a case where the company ID is not included in the URL parameter acquired at the time of the access by the user, the company ID acquisition module 503 acquires the company ID in some way. One of conceivable ways to enable the acquisition of the company ID by the company ID acquisition module 503 is as follows. For example, the authentication service A 400 may set the company ID in a Hypertext Transfer Protocol (HTTP) header, and the company ID acquisition module 503 may acquire the company ID from the HTTP header. The company ID saving module 504 saves the acquired company ID in the service B 550, by associating this information with the user (or a session).

The data acquisition module 505 acquires work data from the service B 550. The document generation module 506 acquires a form managed by a form management module (not illustrated), and generates document data from the work data acquired by the data acquisition module 505 and the form. The page generation module 507 generates a response page and returns the generated response page to the client PC 200.

Figure 6:
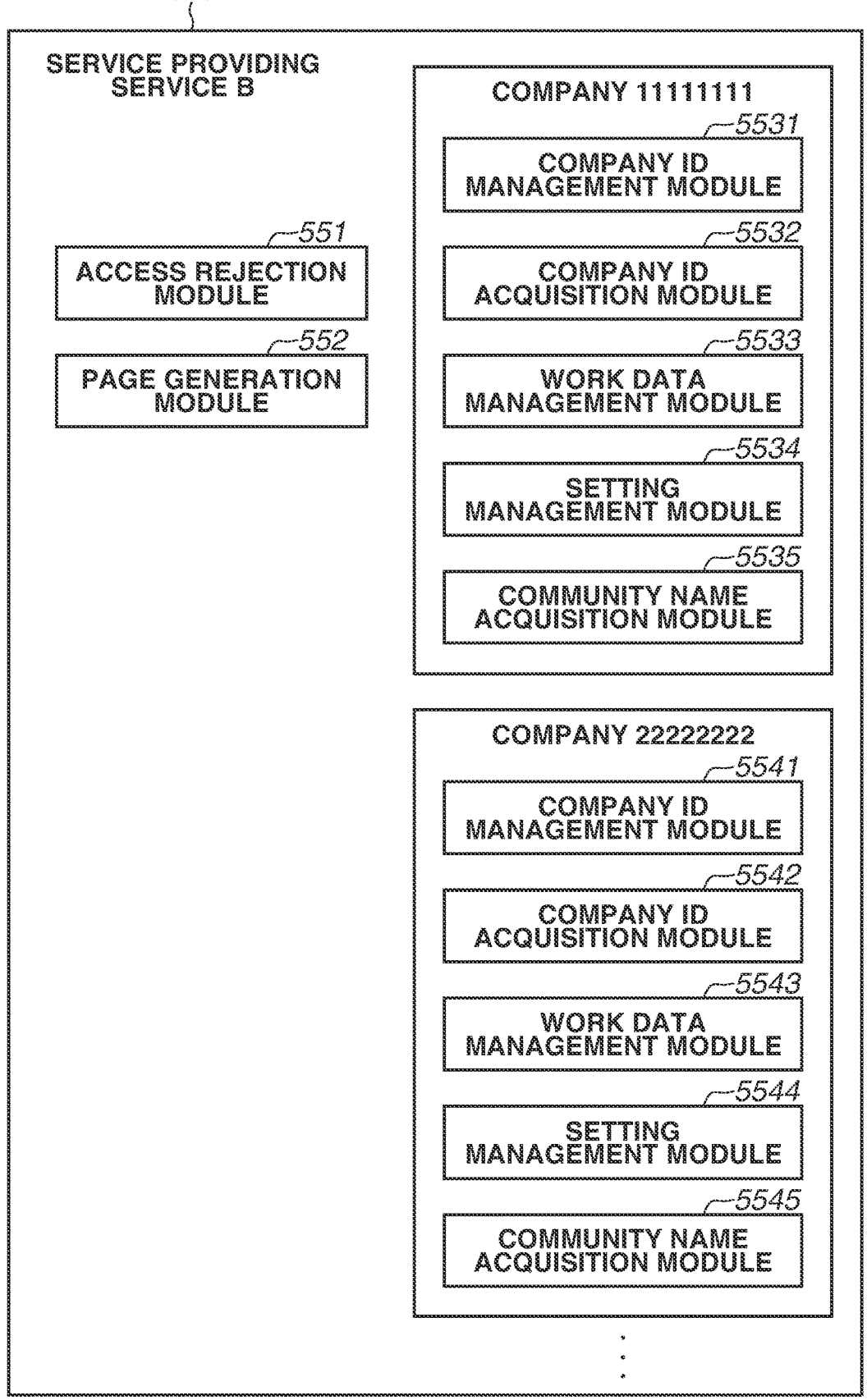
FIG. 6 is a diagram illustrating a module configuration of a service B.

FIG. 6 is a diagram illustrating a module configuration of the service B 550.

The service B 550 includes an access rejection module 551, company ID management modules 5531 and 5541, and company ID acquisition modules 5532 and 5542. The service B 550 further includes work data management modules 5533 and 5543, setting management modules 5534 and 5544, and community name acquisition modules 5535 and 5545.

In the service B 550, the company ID management module, the company ID acquisition module, the work data management module, the setting management module, and the community name acquisition module are provided for each tenant (company or contract). In other words, a user uses various modules assigned to a tenant to which the user belongs. FIG. 6 illustrates two tenants (a company 11111111 and a company 22222222). Each module is assumed to operate in response to a request about each tenant. These modules assigned to each tenant may be stored in a single HD (the external memory 211), and may logically separate data for each tenant to manage the data. Alternatively, the HD (the external memory 211) may be physically separated and managed.

Here, the community will be described. The community is a different organization (a child tenant) created within a tenant (a parent tenant). The community is a group created in a layer subordinated to the tenant. This organization (the child tenant) is created as each of one or more organizations within the tenant (the parent tenant). A permitted user, among users belonging to other companies and other organizations, can access data of the child tenant. In other words, the purpose of the community is as follows. Users belonging to different companies and organizations are allowed to belong to one virtual organization (the child tenant), and information sharing and collaboration within the organization (the child tenant) are promoted.

In the following description, one virtual organization (a child tenant) is referred to as a community. Further, a conventional tenant (not a community) is hereinafter referred to as a parent tenant, for convenience. A user who has logged in to the community can access only data, access to which is permitted beforehand with respect to the community, among data in the area of the parent tenant.

The community has a community ID and a community name. The community ID is an identifier for uniquely identifying the community. The community ID is a value to be provided automatically when the community is created. The community is created by a user having administrator authority of the service B 550. The community name is a name that can be freely set by the user having the administrator authority of the service B 550. The community name can be changed later by the user having the administrator authority of the service B 550.

Assume that a user having an account of a parent tenant in the service B 550 has an account of each of at least two or more communities. In this case, the user can switch a login destination from one community to another without logging out, after logging in to the parent tenant. In addition, the user can switch the login destination to a certain community "community1", and then to another community "community2".

The service A 500 and the service B 550 have different pieces of tenant information (e.g., a company ID and a community). Assume that a community of the service B 550 is switched to another after SSO execution, and then an attempt is made to use the service A 500. In this case, SSO is not executed in a tenant after the switching and therefore, the service A 500 operates as a tenant before the switching.

Here, setting of the SSO cooperation in the present exemplary embodiment will be described.

FIG. 7 illustrates an example of a company ID management table 650 managed by the company ID management module 5531 or the company ID management module 5541. In the company ID management table 650, a company ID represents a company ID in the service A 500, and a community ID represents a community ID in the service B 550. A null community ID indicates a parent tenant, and a company ID corresponding to the null community ID is assumed to execute the SSO cooperation with the parent tenant.

In the present exemplary embodiment, the SSO cooperation is assumed to be set as follows. For the parent tenant, the SSO cooperation with a company ID "1002AA" of the document generation service is set. For a community "communityId1", the SSO cooperation with a tenant "1003AA" of the document generation service is set.

The description will continue referring back to FIG. 6.

When the service B 550 receives access, the access rejection module 551 determines whether the access of a user is authenticated. When the access rejection module 551 determines that the access is unauthenticated, a page generation module 552 generates an authentication screen and displays the generated screen on a screen of the client PC 200. On the other hand, when the access rejection module 551 determines that the access is unauthenticated, the service B 550 provides the service.

When the service B 550 receives a request for display of work data, the work data management module 5533 or the work data management module 5543 acquires the work data. In a case where a button is included in a screen that displays the work data, the setting management module 5534 or the setting management module 5544 acquires button setting.

When the service B 550 receives a request for display of a company ID saving screen, the community name acquisition module 5535 or the community name acquisition module 5545 acquires a community name present in a parent tenant. As a way of acquiring the community name, for example, an Application Programming Interface (API) for acquiring a list of communities present in the parent tenant is used. The page generation module 552 generates a response page, and returns the generated response page to the client PC 200.

Figure 8:
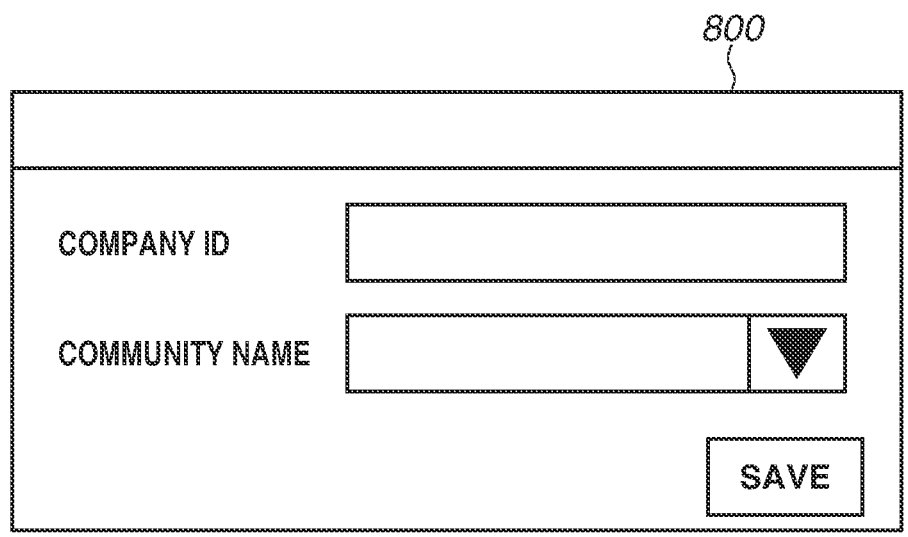
FIG. 8 is a diagram illustrating an example of a company ID saving screen.

FIG. 8 is a diagram illustrating an example of the company ID saving screen.

A company ID saving screen 800 includes a text box for inputting a company ID, a combo box for specifying a community name to be associated with the company ID, and a button for execution of saving. When the button for execution of saving is pressed, the community name acquisition module 5535 or the community name acquisition module 5545 identifies the community ID, based on the community name specified in the company ID saving screen 800. The company ID management module 5531 or the company ID management module 5541 then saves the company ID and the identified community ID, by associating these pieces of information with each other. As a method for specifying the community name, a method for allowing a user to input the community name directly may be adopted, other than the method for selecting one from a list of community names. The community name may be null. In a case where SSO is performed in a parent tenant, saving is executed with a null community ID.

In the present exemplary embodiment, it is assumed that the user having the administrator authority of the tenant of the service B 550 accesses the company ID saving screen 800. Further, it is assumed that, before start of a flow of processing illustrated in FIG. 12 to be described below, the user accesses the company ID saving screen 800, and a company ID and a community ID are associated with each other and saved.

FIG. 9 is a diagram illustrating an example of button setting according to the present exemplary embodiment. This button setting is placed, for example, in the screen that displays the work data, provided by the service B 550.

A display name 901 for a button is set to be "document creation". An operation 902 to be performed when this button is pressed is defined as execution of JavaScript (registered trademark) on a browser of the client PC 200. Further, a content 903 of JavaScript (registered trademark) to be executed is defined in a description example illustrated in FIG. 9.

A part defined as acquisition of a company ID acquires the company ID from the company ID acquisition module to be described below. A conceivable method for acquiring the company ID is, for example, a method for calling a web service API for acquiring a company ID, and this method is open to the public. The script "{!$ Api.Session_ID}" means that a session ID of an authenticated user is to be acquired from a session management module (not illustrated) of the service B 550. The script "{!$ Api.Server_URL}" means that a URL for access to the service B 550 is to be acquired by the service A 500. The script "{!Opportunity.Id}" means that a record ID of a business meeting record displayed in the screen is to be acquired.

When the button set in the manner illustrated in FIG. 9 is pressed, JavaScript (registered trademark) is executed on the browser of the client PC 200, and another window appears for redirection to "http://service_a/service". As a URL parameter for the redirection, a company ID URL is included in a parameter "TENANT_ID", a session ID of an authenticated user is included in a parameter "sessionid", and a URL for accessing the service B 550 is included in a parameter "serverurl". In the present exemplary embodiment, the company ID included in the URL parameter refers to the value of the parameter "TENANT_ID", unless otherwise specified.

When the service B 550 receives a request for saving of a company ID, the company ID management module 5531 or the company ID management module 5541 saves the company ID. When the service B 550 receives a request for acquisition of a company ID, the company ID acquisition module 5532 or the company ID acquisition module 5542 acquires the company ID from the company ID management module 5531 or the company ID management module 5541, and returns the acquired company ID. The company ID acquisition module 5532 or the company ID acquisition module 5542 is, for example, open to the public as a web service API, in such a manner that a company ID acquisition request can be received from the browser of the client PC 200.

Figure 10:
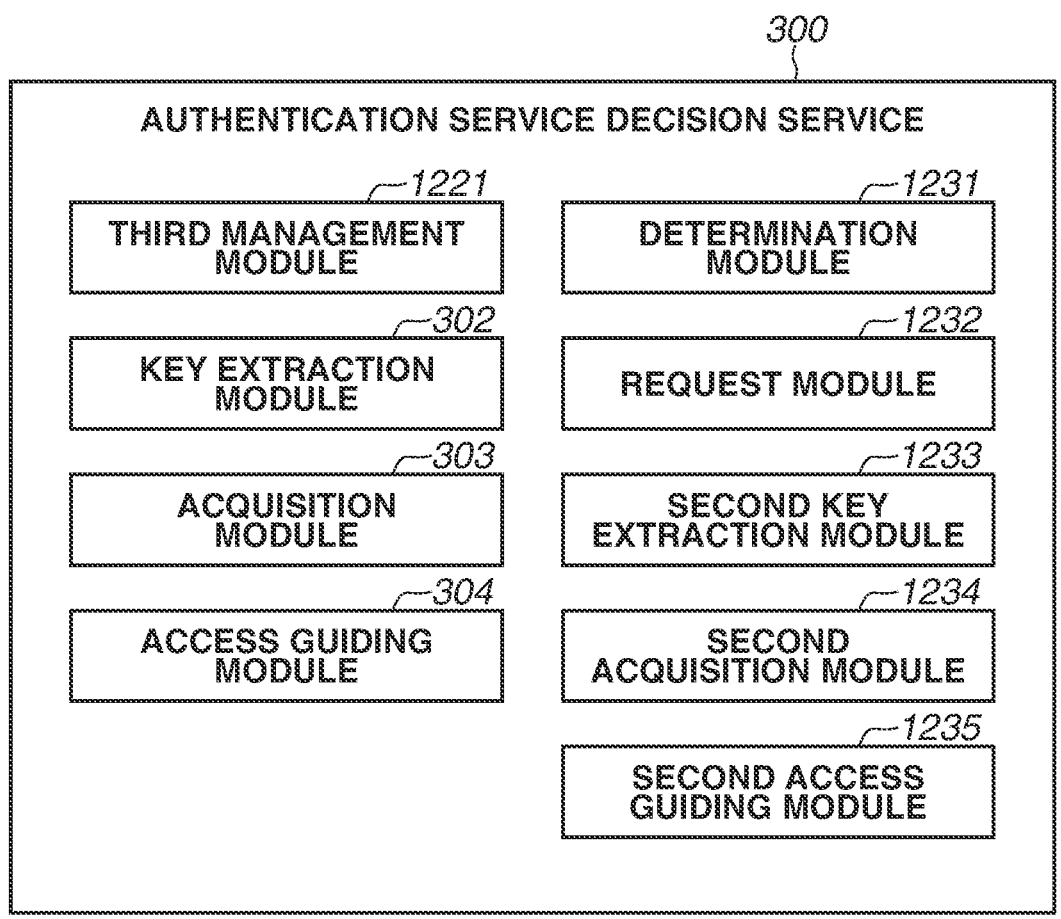
FIG. 10 is a diagram illustrating a module configuration of the authentication service decision service.

FIG. 10 is a diagram illustrating details of the module configuration of the decision service 300 in the present exemplary embodiment.

The decision service 300 includes a third management module 1221, the key extraction module 302, the acquisition module 303, and the access guiding module 304. The decision service 300 further includes a determination module 1231, a request module 1232, a second key extraction module 1233, a second acquisition module 1234, and a second access guiding module 1235.

The third management module 1221 stores a company ID, and information of an authentication apparatus for authenticating a user of the company ID, by associating these pieces of information with each other. The third management module 1221 corresponds to the management module 301 in FIG. 3A.

When the decision service 300 receives access from an unauthenticated user, the determination module 1231 determines whether a company ID is included in the parameter of the user access. When the company ID is not included, the request module 1232 displays a screen for requesting the company ID. The second key extraction module 1233 extracts the company ID input into the screen. The second acquisition module 1234 acquires information of an authentication apparatus from the third management module 1221, by using the extracted company ID. The second access guiding module 1235 guides the access of the user to the decision service 300, to an appropriate authentication service, according to the acquired information of the authentication apparatus. The authentication service B 450 is assumed to implement SSO with the authentication service A 400.

Although the company ID is used as a group identifier of the user, the group identifier of the user is not limited to the company ID. In addition, in the present exemplary embodiment, the third management module 1221 is used, and the company ID is used as the information to become the key for deciding an authentication apparatus. However, the information to become the key for deciding an authentication apparatus is not limited to the company ID.

Figure 11:
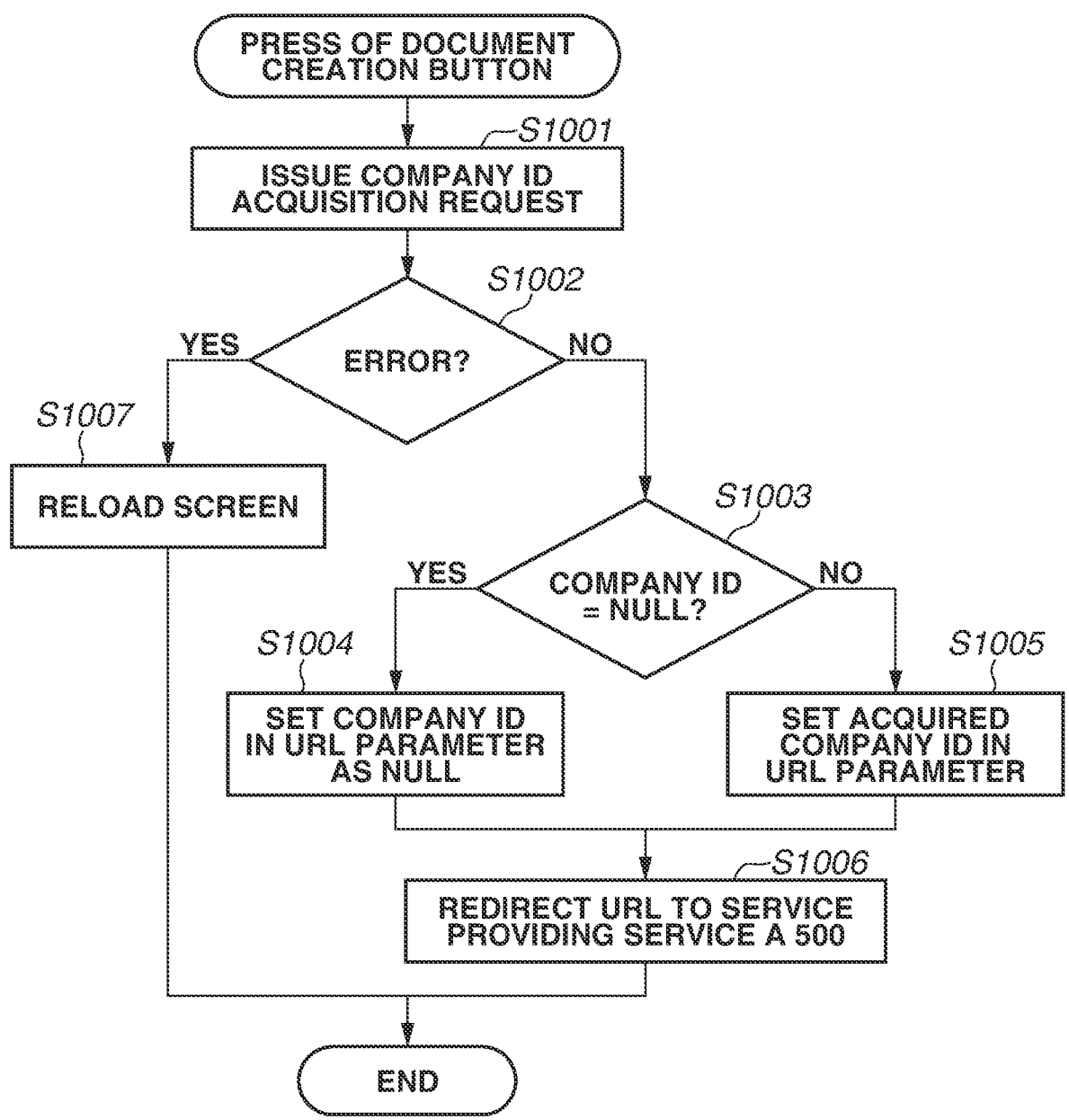
FIG. 11 is a flowchart illustrating processing to be executed by a browser of the client PC.

FIG. 11 is a flowchart illustrating processing to be executed by the browser of the client PC 200.

The flow of the processing starts when a user provides an instruction for receiving the document creation service, by pressing the document creation button in the screen of work data (not illustrated) displayed on the browser of the client PC 200, after accessing the service B 550. The flow of the processing is executed by the browser executing JavaScript (registered trademark), at the press of the button. The document creation button corresponds to the button for which the setting in FIG. 9 is performed. The user having the administrator authority of the tenant of the service B 550 places this button beforehand in the screen of work data. The user requests the service A 500 to provide the service, by pressing the document creation button.

In step S1001, the browser of the client PC 200 issues a company ID acquisition request to the service B 550. The service B 550 has disclosed the web service API for acquiring a company ID, and the web service API returns a company ID associated with an organization to which the user has logged in.

In step S1002, the browser of the client PC 200 determines whether a process for acquiring the company ID is completed with no error. If the process is completed with no error (NO in step S1002), the processing proceeds to step S1003. On the other hand, if an error has occurred (YES in step S1002), the processing proceeds to step S1007.

In step S1003, the browser of the client PC 200 determines whether the acquired company ID is null. When the acquired company ID is null (YES in steps S1003), the processing proceeds to step S1004. On the other hand, when the acquired company ID is not null (NO in steps S1003), the processing proceeds to step S1005.

In step S1004, the browser of the client PC 200 sets the company ID in the URL parameter as a null.

In step S1005, the browser of the client PC 200 sets the acquired company ID in the URL parameter.

Then, in step S1006, the browser of the client PC 200 redirects the URL including the company ID, thereby requesting the service A 500 to provide the service.

If it is determined that an error has occurred in step S1002 (YES in step S1002), then in step S1007, screen reloading is performed. Examples of a case where it is determined that an error has occurred include a case where a session of an authenticated user ends in the service B 550. In this case, an authentication screen is displayed again by reloading the screen. After authentication is successfully performed, the authentication screen can transition back to a screen displayed last. An error screen may be displayed instead of performing the screen reloading in step S1007.

Then, the flow of the processing executed by the browser of the client PC 200 ends.

Figure 12:
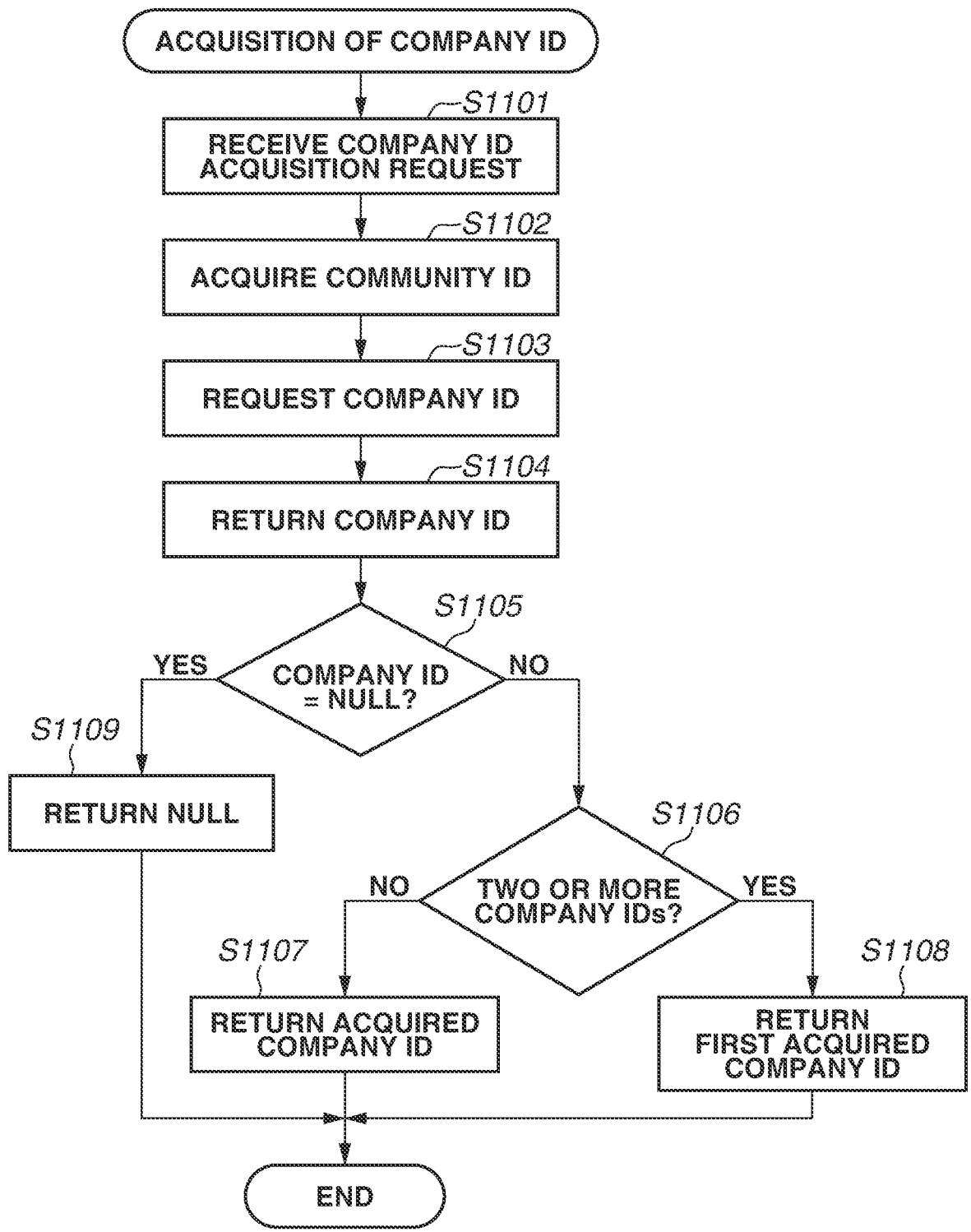
FIG. 12 is a flowchart illustrating processing to be executed by the service B.

FIG. 12 is a flowchart illustrating processing to be executed by the service B 550.

The flow of the processing starts when the browser of the client PC 200 issues the company ID acquisition request to the service B 550 in step S1001.

In step S1101, the service B 550 receives the company ID acquisition request. In step S1102, the community name acquisition module 5535 or the community name acquisition module 5545 acquires the community ID of an organization to which the user is currently logging in. As a method for acquiring the community ID of the organization to which the user is currently logging in, for example, an API for acquiring information of a logged-in organization is prepared beforehand, and then used. When the user has logged in to the parent tenant, the community ID of the organization to which the user is logging in is null.

In step S1103, the company ID acquisition module 5532 or the company ID acquisition module 5542 requests a company ID, by specifying the community ID acquired in step S1102. The company ID acquisition module 5532 or the company ID acquisition module 5542 requests the company ID management module 5531 or the company ID management module 5541 to provide the company ID.

In step S1104, upon being requested to provide the company ID, the company ID management module 5531 or the company ID management module 5541 searches the company ID management table 650. The company ID management module 5531 or the company ID management module 5541 then acquires a record in which the value of "community ID" matches with the specified community ID, and returns the company ID of the acquired record. When the specified community ID is null, the company ID of a record including a null community ID is returned.

In step S1105, the company ID acquisition module 5532 or the company ID acquisition module 5542 determines whether the acquired company ID is null. If it is determined that the company ID is null (YES in step S1105), the processing proceeds to step S1109. If it is determined that the company ID is not null (NO in step S1105), the processing proceeds to step S1106.

In step S1106, the company ID acquisition module 5532 or the company ID acquisition module 5542 determines whether two or more company IDs are included. If it is determined that one company ID is included (NO in step S1106), the processing proceeds to step S1107. If it is determined that two or more company IDs are included (YES in step S1106), the processing proceeds to step S1108.

In step S1107, the company ID acquisition module 5532 or the company ID acquisition module 5542 returns the acquired company ID to the client PC 200, as a response.

In step S1108, the company ID acquisition module 5532 or the company ID acquisition module 5542 returns a first company ID among the acquired company IDs to the client PC 200, as a response. The company IDs acquired in step S1108 are assumed to be acquired from the company ID management module 5531 or the company ID management module 5541 in chronological order according to saving time of the company IDs. However, the order of acquisition is not limited to the chronological order according to saving time of the company IDs.

If it is determined that the company ID is null in step S1105 (YES in step S1105), then in step S1109, the company ID acquisition module 5532 or the company ID acquisition module 5542 returns the company ID as being null to the client PC 200, as a response.

Then, the flow of the processing executed by the service B 550 ends.

Figure 13:
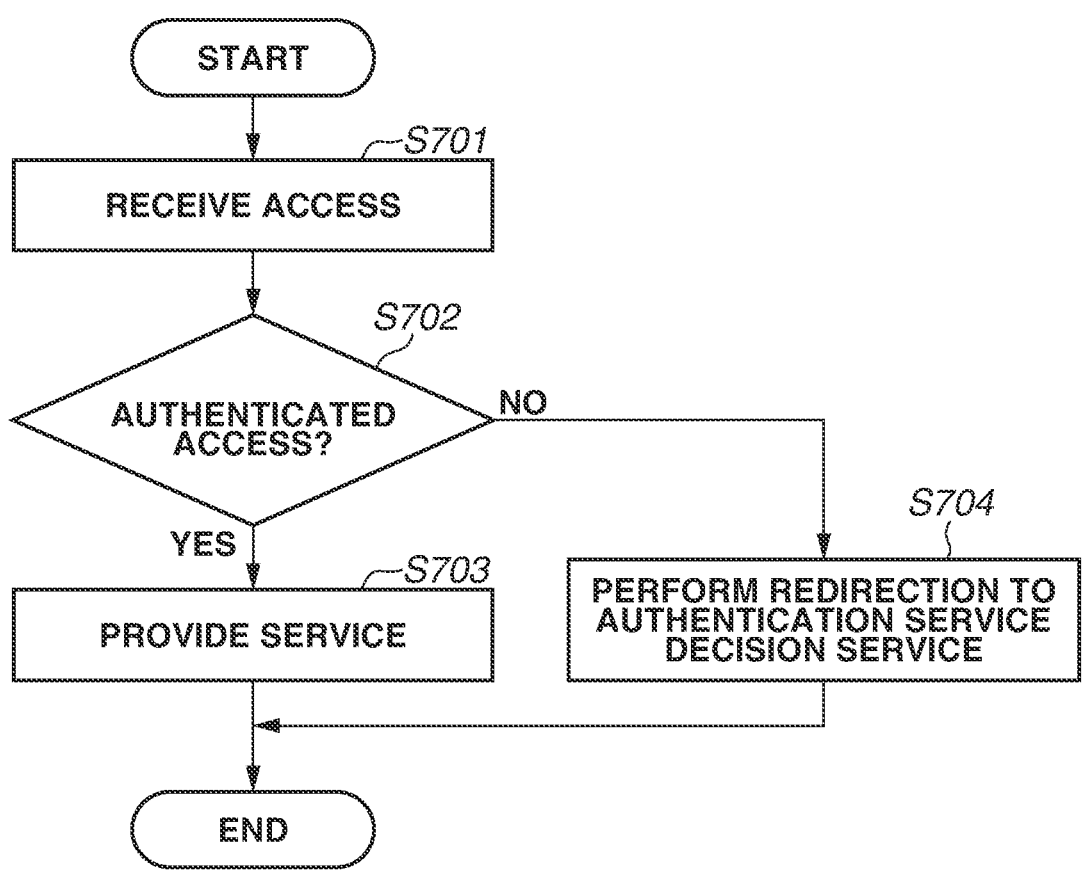
FIG. 13 is a flowchart illustrating processing to be executed by the service A.

FIG. 13 is a flowchart illustrating processing to be executed by the service A 500. The flow of the processing starts when the browser of the client PC 200 accesses the service A 500 in step S1006.

In step S701, the service A 500 receives the access of the user.

In step S702, the access rejection module 501 determines whether the access received in step S701 is authenticated. In the present exemplary embodiment, the access rejection module 501 determines that the access is authenticated if an authentication session ID is added to an HTTP header. If the access is authenticated (YES in step S702), the processing proceeds to step S703. If the access is not authenticated (NO in step S702), the processing proceeds to step S704.

In step S703, the service A 500 provides the service as illustrated by the flowchart in FIG. 18 to be described below, and then the processing of the flowchart in FIG. 13 ends.

In step S704, the access rejection module 501 redirects the access determined to be unauthenticated in step S702, to the decision service 300. At the time, information for causing access to the service A 500 again after completion of authentication is added. When the information is added and the redirection is completed, the flow of the processing ends.

Figure 14:
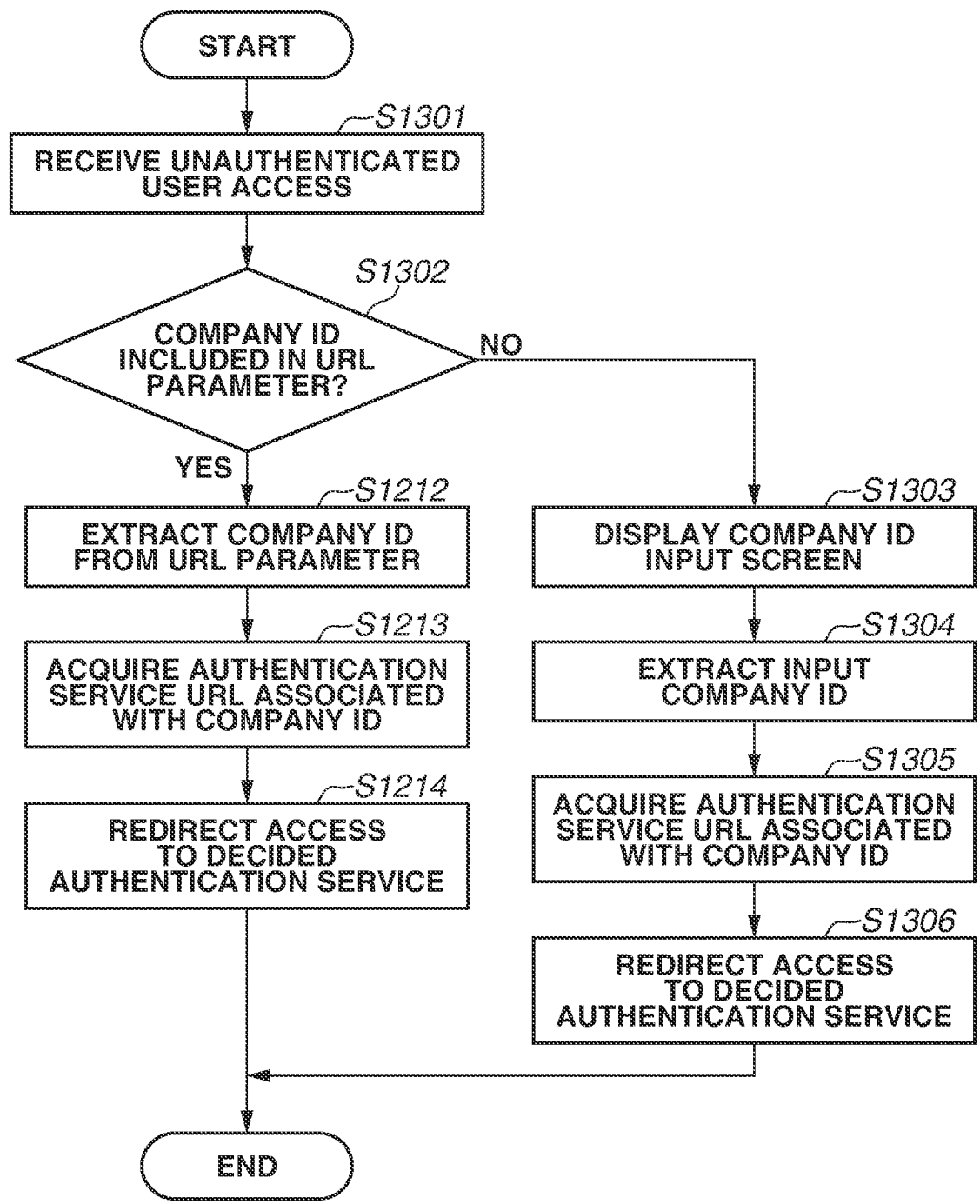
FIG. 14 is a flowchart illustrating processing to be executed by the decision service.

FIG. 14 is a flowchart illustrating processing to be executed by the decision service 300. The flow of the processing starts when the user directly accesses the decision service 300, or the access of the user is redirected from the service A 500 in step S704.

In step S1301, the decision service 300 receives unauthenticated user access.

In step S1302, the determination module 1231 determines whether a company ID is included in the URL parameter of the unauthenticated user access. If it is determined that a company ID is included (YES in step S1302), the processing proceeds to step S1212. If it is determined that no company ID is included (NO in step S1302), the processing proceeds to step S1303.

In step S1303, the request module 1232 causes the client PC 200 to display a company ID input screen (not illustrated).

In step S1304, the second key extraction module 1233 extracts a company ID input in the company ID input screen.

In step S1305, by using the company ID extracted in step S1304, the second acquisition module 1234 acquires information of an authentication apparatus (apparatus information) associated with the company ID, from the third management module 1221. Here, for example, if the company ID extracted in step S1304 is "11111111", the apparatus information that can be acquired is a URL "http://service_b/?sp=http%3A%2F%2Fservice_a%2F" of the authentication service B 450. This URL is assumed to correspond to a case where the authentication service B 450 and the authentication service A 400 execute SSO.

In step S1306, the second access guiding module 1235 redirects the unauthenticated user access to the authentication apparatus, according to the apparatus information acquired in step S1305. At the time, if access destination information after authentication completion is received in step S1301, the access destination information is added here as well and the redirection is performed. In this process, the acquired company ID is not added to the parameter "TENANT_ID" of the access destination information. In the present exemplary embodiment, the acquired company ID is added to an HTTP header and the redirection is performed.

In step S1212, the key extraction module 302 extracts the company ID from the URL parameter of the unauthenticated user access.

In step S1213, by using the company ID extracted in step S1212, the acquisition module 303 acquires information of an authentication apparatus (apparatus information) associated with the company ID, from the third management module 1221. Here, if, for example, the company ID extracted in step S1212 is "11111111", the apparatus information that can be acquired is the URL "http://service_b/?sp=http %3A%2F%2Fservice_a%2F" of the authentication service B 450. This URL is assumed to correspond to the case where the authentication service B 450 and the authentication service A 400 execute SSO.

In step S1214, the access guiding module 304 redirects the unauthenticated user access, according to the apparatus information acquired in step S1213. At the time, if access destination information after authentication completion is received in step S1301, the access destination information is added here as well and the redirection is performed. The flow of the processing ends upon completion of the redirection.

Figure 15:
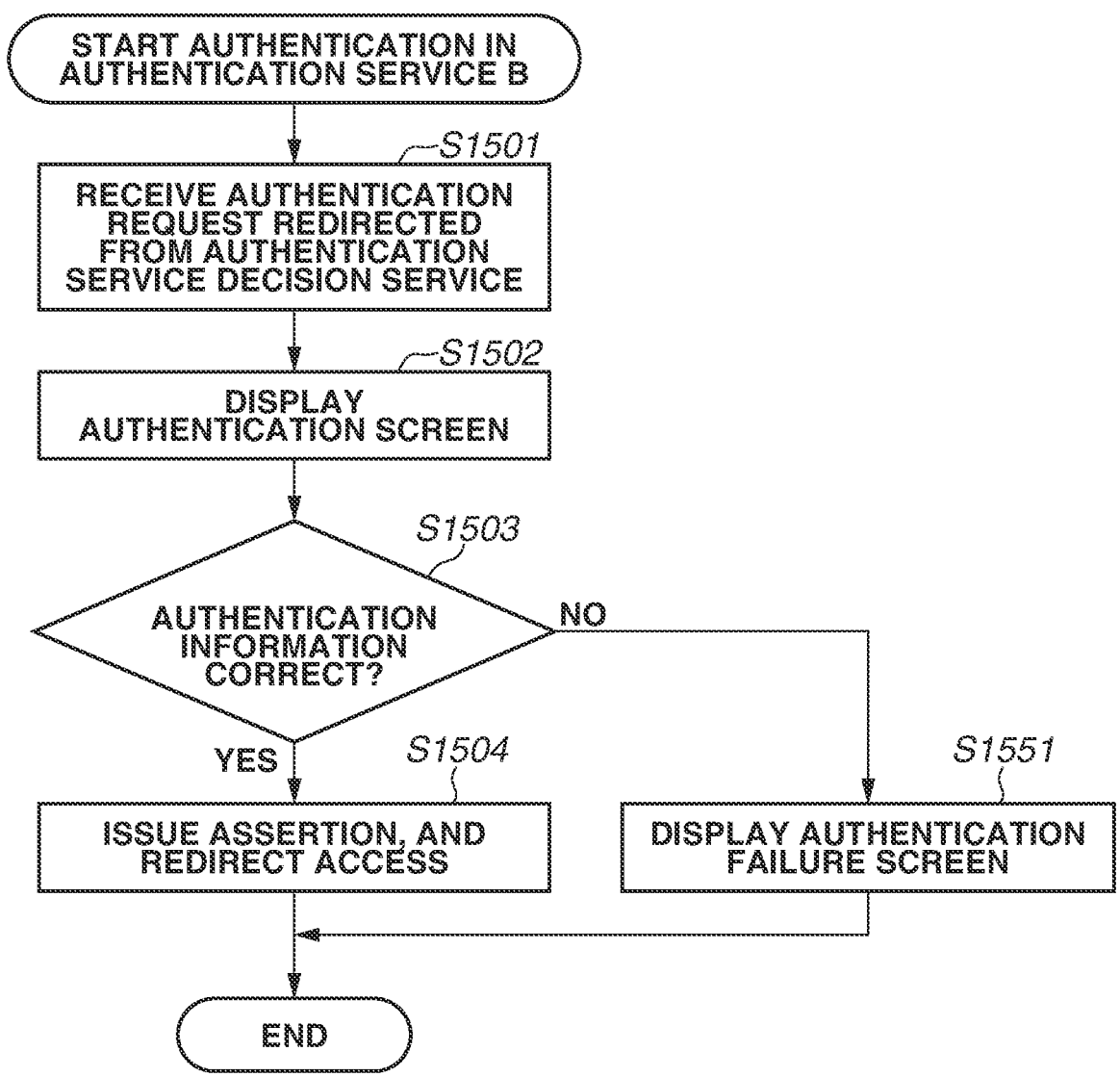
FIG. 15 is a flowchart illustrating processing to be executed by an authentication service B.

FIG. 15 is a flowchart illustrating processing to be executed by the authentication service B 450 when SSO is implemented. The flow of the processing starts when the access of the user is redirected from the decision service 300 in step S1214 or step S1306.

In step S1501, the authentication service B 450 receives an authentication request redirected from the decision service 300. Further, the authentication service B 450 acquires a redirection destination to be used when authentication is successful, from the URL. In the present exemplary embodiment, for example, a part indicated by "?sp=http%3A%2F%2Fservice_a%2F" represents the redirection destination.

Figure 16:
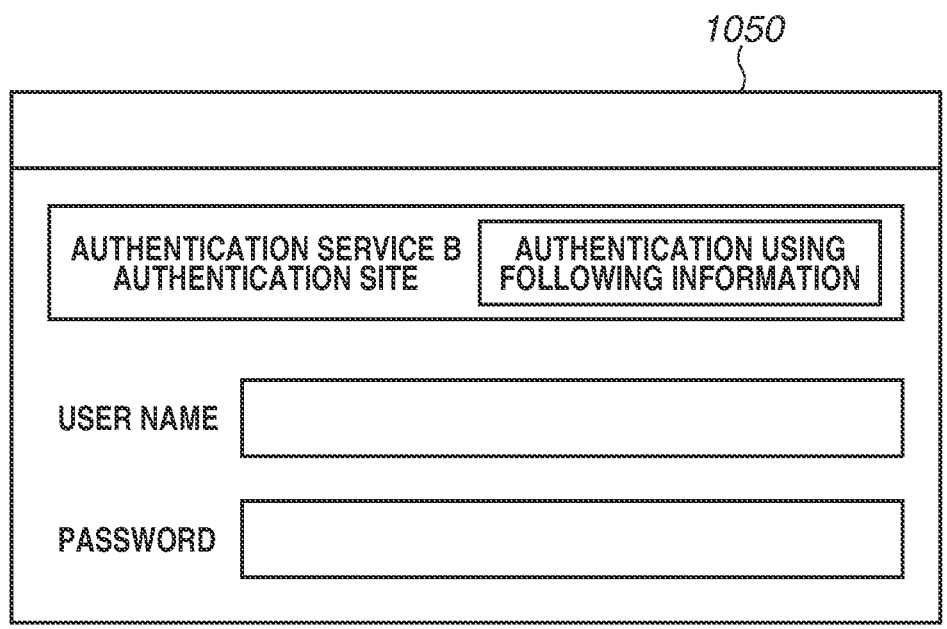
FIG. 16 is a diagram illustrating an example of an authentication screen of the service B.

In step S1502, the service B authentication module 451 displays an authentication screen. FIG. 16 illustrates an example of the authentication screen. An authentication screen 1050 is displayed to prompt the user to input a user name and a password for performing authentication.

In step S1503, the service B authentication module 451 confirms whether the authentication information input in the authentication screen 1050 is correct. If the authentication information is correct (YES in step S1503), the processing proceeds to step S1504. If the authentication information is not correct (NO in step S1503), the processing proceeds to step S1551.

In step S1504, the assertion issuance module 452 issues an assertion corresponding to the authentication information determined to be correct in step 1503. The assertion may be referred to as a credential in some cases. Upon issuing the assertion, the assertion issuance module 452 redirects the access of the user to the URL of the redirection destination acquired in step S1501. At the time, if, for example, access destination information after authentication completion is received in step S1501, this information is added here as well, and the redirection is performed. The flow of the processing ends upon completion of the redirection.

In step S1551, the service B authentication module 451 displays a screen for notifying an authentication failure due to incorrect authentication information input in the authentication screen 1050, and then ends the flow of the processing. Here, the client PC 200 displays this authentication failure screen transmitted from the service B authentication module 451. This screen may be a screen for returning to step S1502 to receive the authentication information from the user. Alternatively, this screen may be a screen that merely indicates that the authentication has failed. Moreover, the screen is limited to neither of these screens. At this point, the access of the user is in an unauthenticated state and thus, even if the user attempts to continue the access to the service A 500, the access is not permitted. In that case, the processing illustrated by the flowchart in FIG. 13 is executed.

Figure 17:
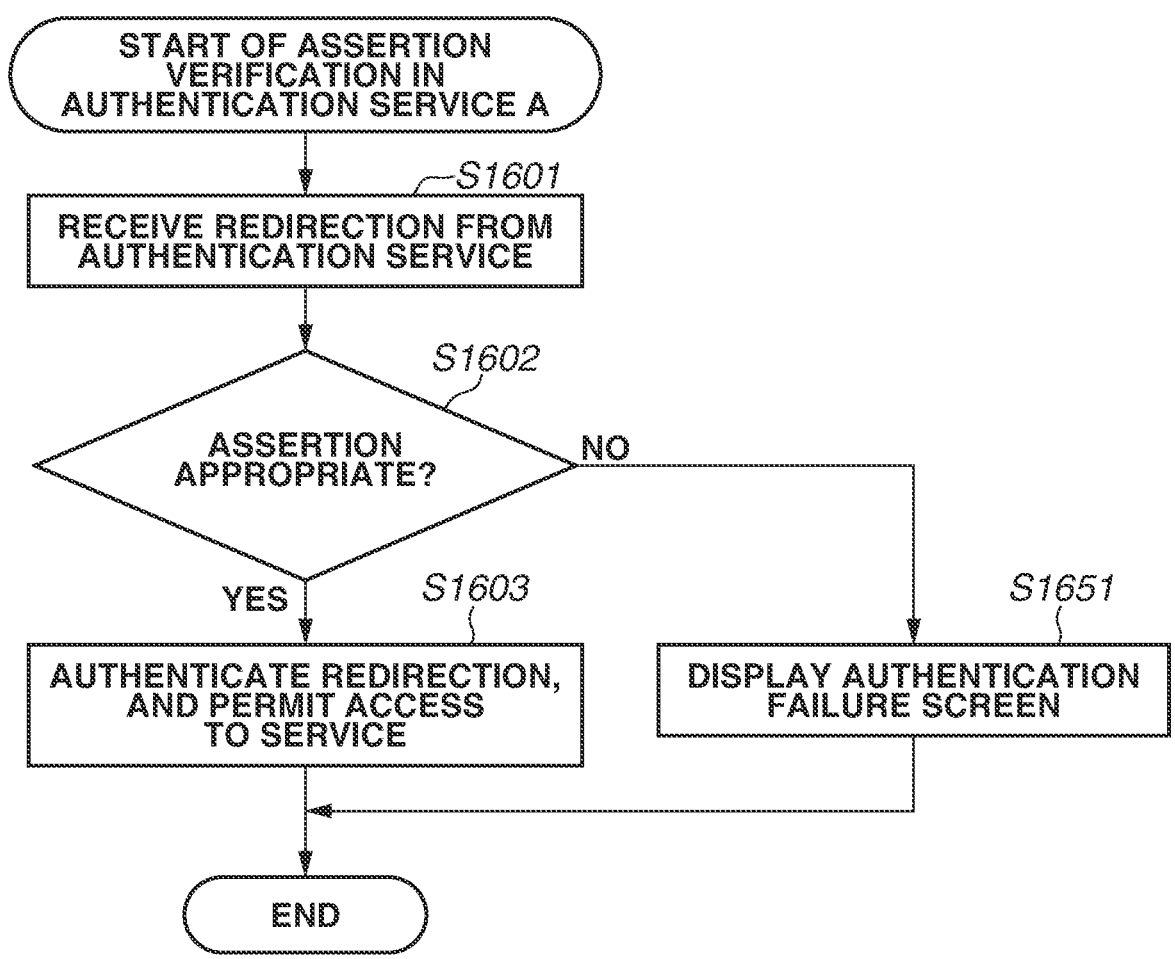
FIG. 17 is a flowchart illustrating processing to be executed by an authentication service A.

FIG. 17 is a flowchart illustrating processing to be executed by the authentication service A 400 when SSO is implemented. The flow of the processing starts when the access of the user is successfully authenticated in the authentication service B 450, and then redirected in step S1504.

In step S1601, the authentication service A 400 receives the redirection from the authentication service B 450.

In step S1602, the assertion verification module 402 verifies whether an assertion included in the redirection received in step S1601 is appropriate. If it is determined that the assertion is appropriate as a result of the verification (YES in step S1602), the processing proceeds to step S1603. If it is determined that the assertion is not appropriate (NO in step S1602), the processing proceeds to step S1651.

In step S1603, the service A authentication module 401 authenticates the redirection received in step S1601, and permits the access to the service. Here, if access destination information after authentication completion is received in step S1601, the access of the user is redirected based on this information. For example, in a case where the service A 500 is specified as the redirection destination after authentication completion, the access of the user is redirected to the service A 500. At this time, the access of the user is authenticated and therefore, the user can receive the service provided by the service A 500. The flow of the processing ends upon completion of the redirection.

In step S1651, the service A authentication module 401 displays a screen for notifying an authentication failure due to an appropriate assertion, and then ends the flow of the processing.

Figure 18:
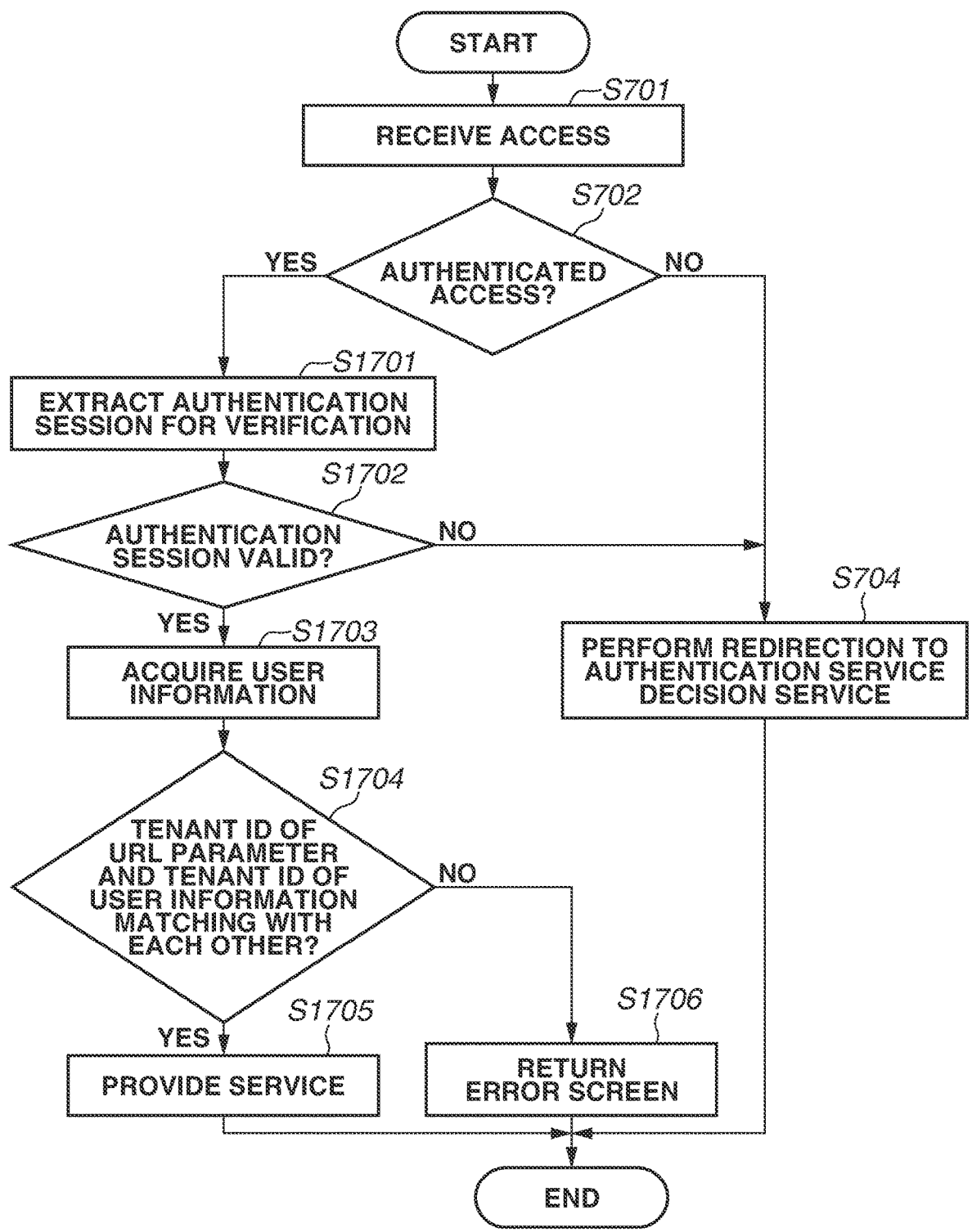
FIG. 18 is a flowchart illustrating processing to be executed by the service A.

FIG. 18 is a flowchart illustrating processing to be executed by the service A 500. The flow of the processing starts when the browser of the client PC 200 accesses the service A 500 in step S1006, or the authentication service A 400 redirects the access of the user to the service A 500 in step S1603.

In step S701, the service A 500 receives the access of the user.

In step S702, the access rejection module 501 determines whether the access received in step S701 is authenticated. In the present exemplary embodiment, the access rejection module 501 determines that the access is authenticated in a case where an authentication session ID is added to an HTTP header. If the access is authenticated (YES in step S702), the processing proceeds to step S1701. If the access is not authenticated (NO in step S702), the processing proceeds to step S704.

In step S1701, the access rejection module 501 extracts the authentication session ID from the HTTP header.

In step S1702, the access rejection module 501 inquires the authentication service A 400 whether the authentication session ID extracted in step S1701 is valid. If the extracted authentication session ID is valid (YES in step S1702), the processing proceeds to step S1703. If the extracted authentication session ID is not valid (NO in step S1702), the processing proceeds to step S704.

In step S1703, the access rejection module 501 acquires user information associated with the valid authentication session ID, from the authentication service A 400. The user information to be acquired includes a tenant ID.

Subsequently, in step S1704, the access rejection module 501 performs a comparison between the tenant ID included in the URL parameter and the tenant ID included in the acquired user information, and thereby determines whether these tenant IDs match with each other. If the tenant IDs match with each other (YES in step S1704), the processing proceeds to step S1705. In step S1705, the service A 500 provides the service.

If it is determined that the tenant IDs do not match with each other as a result of the comparison (NO in step S1704), the processing proceeds to step S1706. In step S1706, the service A 500 returns an error screen for notifying an authentication failure to the client PC 200 to cause the client PC 200 to display the error screen, and then ends the flow of the processing.

The execution of the above-described flow of the processing causes the following operation. When a user who has logged in to the parent tenant of the service B 550 presses the document creation button, a tenant ID "1002AA" is transmitted to the service A 500 by using a URL parameter. SSO with a user associated with the company ID "1002AA" of the service A 500 is performed, and the service A 500 provides the service. Next, when the user changes the login destination to the community "communityId1" of the service B 550 and then presses the document creation button, a tenant ID "1003AA" is transmitted to the service A 500 by using a URL parameter. The tenant ID ("1003AA") included in the URL parameter and the tenant ID ("1002AA") included in the user information associated with the authentication session ID do not match with each other (NO in step S1704). Accordingly, the service A 500 displays a screen for notifying an authentication failure.

As described above, according to the present exemplary embodiment, it is possible to prevent referring to data of an unintended tenant, in a case where a user for which the SSO cooperation is set switches a login destination organization of the service B 550 to generate a document.

In the first exemplary embodiment, it is assumed that SSO is performed between a user logging in to a parent organization or a community of the service B 550 and a user associated with a company ID of the service A 500. In a second exemplary embodiment, it is assumed that a user logs in by performing authentication based on authentication information input in an authentication screen displayed by the authentication service A 400, without performing SSO.

In the description of the present exemplary embodiment, a part common to the first exemplary embodiment will not be described, and only a different part will be described.

Figure 19:
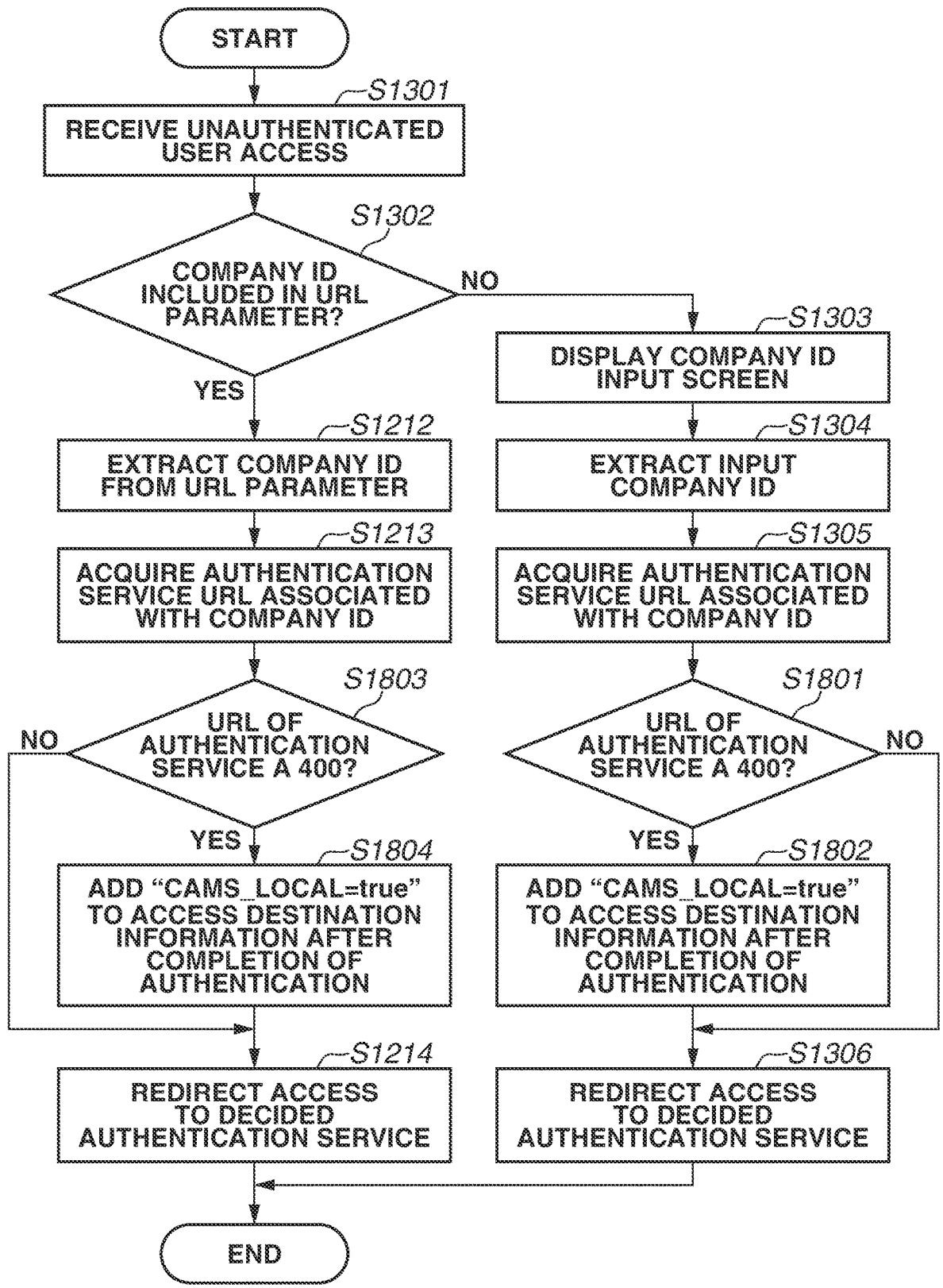
FIG. 19 is a flowchart illustrating processing to be executed by the decision service.

FIG. 19 is a flowchart illustrating processing to be executed by the decision service 300. The flow of the processing starts when a user directly accesses the authentication service decision service (the decision service 300), or access of the user is redirected from the service A 500.

In step S1301, the decision service 300 receives unauthenticated user access.

In step S1302, the determination module 1231 determines whether a company ID is included in a URL parameter of the unauthenticated user access. If it is determined that a company ID is included (YES in step S1302), the processing proceeds to step S1212. If it is determined that no company ID is included (NO in step S1302), the processing proceeds to step S1303.

In step S1303, the request module 1232 displays a company ID input screen (not illustrated).

In step S1304, the second key extraction module 1233 extracts a company ID input in the company ID input screen (not illustrated).

In step S1305, by using the company ID extracted in step S1304, the second acquisition module 1234 acquires information of an authentication apparatus (apparatus information) associated with the extracted company ID, from the third management module 1221.

In step S1801, the determination module 1231 determines whether the apparatus information acquired in step S1305 is the URL of the authentication service A 400. If the apparatus information is the URL of the authentication service A 400 (YES in step S1801), the processing proceeds to step S1802. On the other hand, if the apparatus information is not the URL of the authentication service A 400 (NO in step S1801), the processing proceeds to step 1306 by skipping step S1802.

In step S1802, if access destination information after authentication completion is received in step S1301, the second access guiding module 1235 adds "CAMS_LOCAL=true" to a query parameter of the above-described information.

Subsequently, in step S1306, the second access guiding module 1235 redirects the unauthenticated user access, according to the apparatus information acquired in step S1305. In this process, the above-described information is added and the redirection is performed.

In step S1212, the key extraction module 302 extracts the company ID from the URL parameter of the unauthenticated user access.

In step S1213, using the company ID extracted in step S1212, the acquisition module 303 acquires information of an authentication apparatus (apparatus information) associated with the company ID, from the third management module 1221.

In step S1803, the determination module 1231 determines whether the apparatus information acquired in step S1213 is the URL of the authentication service A 400. If the apparatus information is the URL of the authentication service A 400 (YES in step S1803), the processing proceeds to step S1804. On the other hand, if the apparatus information is not the URL of the authentication service A 400 (NO in step S1803), the processing proceeds to step S1214.

In step S1804, if access destination information after authentication completion is received in step S1301, the second access guiding module 1235 adds "CAMS_LOCAL=true" to a query parameter of the above-described information.

Subsequently, in step S1214, the second access guiding module 1235 redirects the unauthenticated user access, according to the apparatus information acquired in step S1213. In this process, the above-described information is added and the redirection is performed. The flow of the processing ends upon completion of the redirection.

Figure 20:
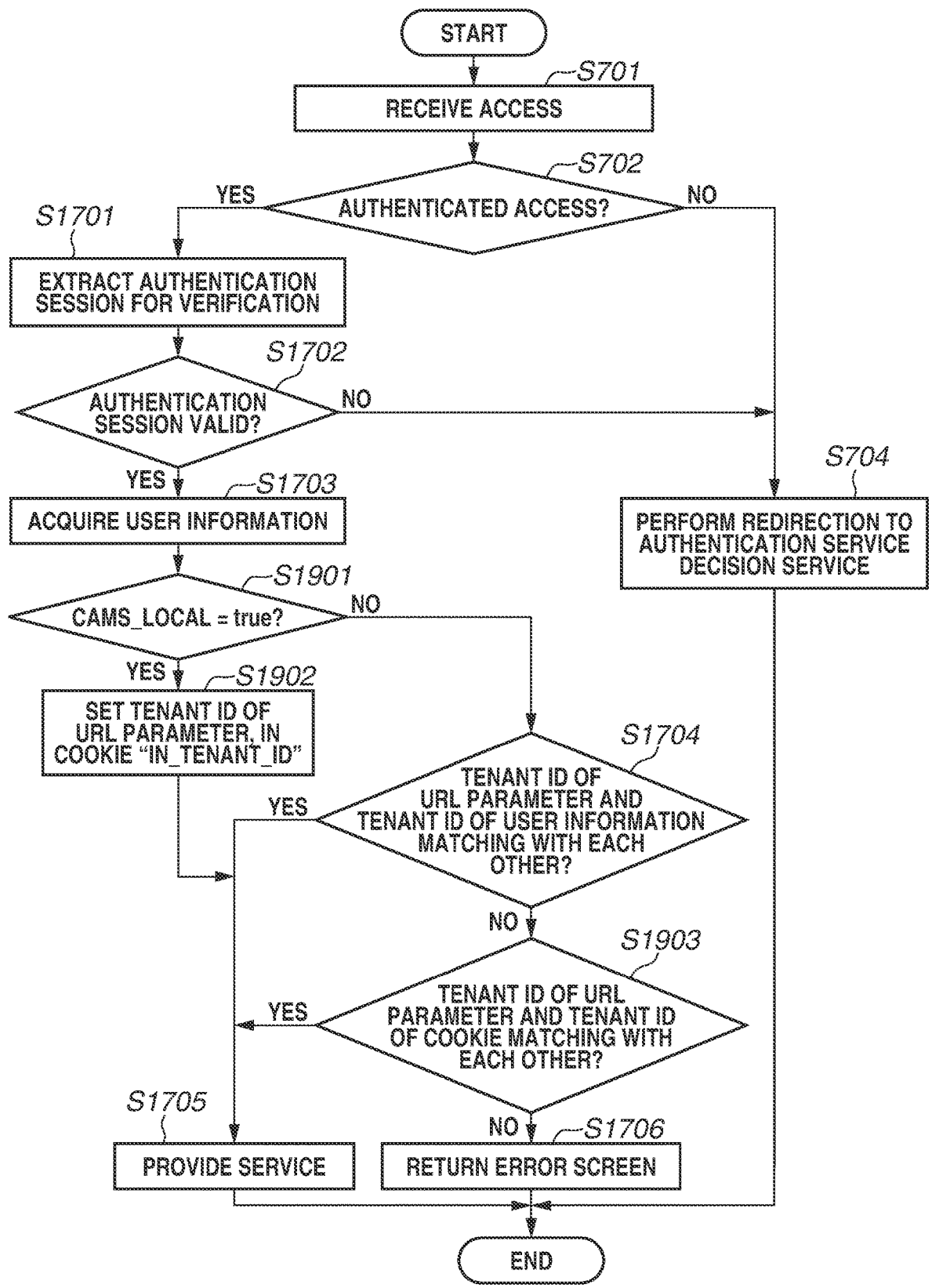
FIG. 20 is a flowchart illustrating processing to be executed by the service A.

FIG. 20 is a flowchart illustrating processing to be executed by the service A 500. The flow of the processing starts when the browser of the client PC 200 accesses the service A 500 in step S1006, or the authentication service A 400 redirects the access of the user to the service A 500 in step S1603.

In step S701, the service A 500 receives the access of the user. In step S702, the access rejection module 501 determines whether the access received in step S701 is authenticated. In the present exemplary embodiment, the access rejection module 501 determines that the access is authenticated, in a case where an authentication session ID is added to an HTTP header. If the access is authenticated (YES in step S702), the processing proceeds to step S1701. If the access is not authenticated (NO in step S702), the processing proceeds to step S704.

In step S1701, the access rejection module 501 extracts the authentication session ID from the HTTP header.

In step S1702, the access rejection module 501 inquires the authentication service A 400 whether the authentication session ID extracted in step S1701 is valid. If the extracted authentication session ID is valid (YES in step S1702), the processing proceeds to step S1703. If the extracted authentication session ID is not valid (NO in step S1702), the processing proceeds to step S704.

In step S1703, the access rejection module 501 acquires user information associated with the valid authentication session ID, from the authentication service A 400. The user information to be acquired includes a tenant ID. In step S1901, the access rejection module 501 determines whether "CAMS_LOCAL=true" is included in the URL parameter of the user access. If it is determined that "CAMS_LOCAL=true" is included (YES in step S1901), the processing proceeds to step S1902. If it is determined that "CAMS_LOCAL=true" is not included (NO in step S1901), the processing proceeds to step S1704.

In step S1902, the access rejection module 501 sets the tenant ID included in the URL parameter, in a cookie "IN_TENANT_ID".

Then, in step S1705, the service A 500 provides the service. A response in which the cookie "IN_TENANT_ID" is set is returned to the browser and therefore, the cookie "IN_TENANT_ID" is thereafter automatically added to a request when the browser accesses the service A 500.

In step S1704, the access rejection module 501 performs a comparison between the tenant ID included in the URL parameter and the tenant ID included in the user information acquired in step S1703, and thereby determines whether these tenant IDs match with each other. If the tenant IDs match with each other (YES in step S1704), the processing proceeds to step S1705. If the tenant IDs do not match with each other (NO in step S1704), the processing proceeds to step S1903.

In step S1903, the access rejection module 501 performs a comparison between the value of the URL parameter "TENANT_ID" and the value of the cookie "IN_TENANT_ID", and thereby determines whether these values match with each other. If the values match with each other (YES in step S1903), the processing proceeds to step S1705. In step S1705, the service A 500 provides the service.

If it is determined that the values do not match with each other as a result of the comparison in step S1903 (NO in step S1903), the processing proceeds to step S1706. In step S1706, the service A 500 returns a screen for notifying an authentication failure to the client PC 200 to cause the client PC 200 to display the error screen, and then ends the flow of the processing.

The execution of the above-described flow of the processing causes the following operation. When the user who has logged in to the parent tenant of the service B 550 presses the document creation button, the tenant ID "1002AA" is transmitted to the service A 500 by using the URL parameter "TENANT_ID". The authentication service A 400 displays an authentication screen. The user inputs user authentication information of a company ID "1004AA" in the displayed authentication screen. If the authentication is successful, the service A 500 provides the service. At this time, the tenant ID included in the user information associated with the authentication session ID is "1004AA", and the service A 500 refers to data of the tenant ID "1004AA".

In a case where the user presses the document creation button in a state of logging in to the parent tenant of the service B 550, the value ("1002AA") of the URL parameter "TENANT_ID" and the value ("1002AA") of the cookie "IN_TENANT_ID" match with each other. In other words, the result of the determination in step S1903 is YES. Accordingly, the service A 500 provides the service.

Afterward, in a case where the user changes the login destination to the community "communityId1" of the service B 550 and then presses the document creation button, the tenant ID "1003AA" is transmitted to the service A 500 by using the URL parameter "TENANT_ID". The value ("1003AA") of the URL parameter "TENANT_ID" and the value ("1002AA") of the cookie "IN_TENANT_ID" do not match with each other (NO in step S1903). Therefore, the service A 500 displays a screen for notifying an authentication failure.

As described above, according to the present exemplary embodiment, it is possible to prevent referring to data of an unintended tenant, in a case where a user, who is authenticated by inputting authentication information in an authentication screen without performing SSO, changes a login destination organization of the service B 550 to generate a document.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-201635, filed Oct. 13, 2016, which is hereby incorporated by reference herein in its entirety.

What is claimed is:

1. A system comprising:
a client terminal;
a first service providing apparatus; and
a second service providing apparatus,
wherein the first service providing apparatus and the second service providing apparatus cooperate with each other based on single sign-on and a service is provided to the client terminal,
wherein the second service providing apparatus is configured to manage a tenant of the first service providing apparatus in association with a community created as a subordinate group of a tenant of the second service providing apparatus,
wherein the client terminal includes at least one first processor and at least one first memory coupled to the at least one first processor and having stored thereon instructions, which when executed by the at least one first processor, cause the client terminal to perform first operations comprising:
acquiring, from the second service providing apparatus, as a first acquisition, in response to a user, who has received a service provided by the second service providing apparatus, issuing an instruction for requesting provision of a service by the first service providing apparatus, information indicating a tenant of the first service providing apparatus associated with a community to which the user is currently logged in; and
redirecting to the first service providing apparatus in a state in which the information indicating the tenant of the first service providing apparatus acquired in the first acquisition is included in a URL parameter,
wherein the first service providing apparatus includes at least one second processor and at least one second memory coupled to the at least one second processor and having stored thereon instructions, which when executed by the at least one second processor, cause the first service providing apparatus to perform second operations comprising:
in a case where an authenticated access is received from the client terminal, acquiring an authentication session ID from the client terminal;
acquiring as a second acquisition acquire the information indicating the tenant of the first service providing apparatus based on the authentication session ID;
performing a first comparison between the information indicating the tenant of the first service providing apparatus acquired in the second acquisition, and the information indicating the tenant of the first service providing apparatus included in the URL parameter of the client terminal;
in a case where the information indicating the tenant of the first service providing apparatus acquired in the second acquisition and the information indicating the tenant of the first service providing apparatus included in the URL parameter match with each other in the first comparison, providing the service;
in a case where the information indicating the tenant of the first service providing apparatus acquired in the second acquisition and the information indicating the tenant of the first service providing apparatus included in the URL parameter do not match with each other in the first comparison, performing a second comparison, wherein the second comparison is between the information indicating the tenant of the first service providing apparatus included in the URL parameter, and information indicating the tenant of the first service providing apparatus included in a cookie;
in a case where the information indicating the tenant of the first service providing apparatus included in the URL parameter and the information indicating the tenant of the first service providing apparatus included in the cookie match with each other in the second comparison, providing the service; and
in a case where the information indicating the tenant of the first service providing apparatus included in the URL parameter and the information indicating the tenant of the first service providing apparatus included in the cookie do not match with each other in the second comparison, returning an error screen to the client terminal,
wherein a community, to which the user to receive the service by the second service providing apparatus belongs, is changeable by the client terminal.

2. The system according to claim 1, the second operations further comprising:
acquiring the authentication session ID from an HTTP header included in a request received from the client terminal.

3. The system according to claim 1, the second operations further comprising:
inquiring a first authentication apparatus that performs user authentication for the first service providing apparatus whether the authentication session ID is valid,
wherein the second acquisition comprises, in a case where the authentication session ID is valid, acquiring the information indicating the tenant of the first service providing apparatus from the first authentication apparatus, wherein the information indicating the tenant of the first service providing apparatus acquired in the second acquisition is associated with the authentication session ID.

4. The system according to claim 1, wherein the information indicating the tenant of the first service providing apparatus included in the URL parameter of the client terminal is included in a provision request.

5. The system according to claim 1, the second operations further comprising:
setting the information indicating the tenant of the first service providing apparatus in the cookie, in a case where the first service providing apparatus performs authentication of the user without cooperating with the second service providing apparatus based on single sign-on.

6. A control method for a system including a client terminal, a first service providing apparatus, and a second service providing apparatus, in which the first service providing apparatus and the second service providing apparatus cooperate with each other based on single sign-on and a service is provided to the client terminal, the control method comprising:
managing a tenant of the first service providing apparatus in association with a community created as a subordinate group of a tenant of the second service providing apparatus, by the second service providing apparatus;

acquiring, from the second service providing apparatus, as a first acquisition, in response to a user, who has received a service provided by the second service providing apparatus, issuing an instruction for requesting provision of a service by the first service providing apparatus, information indicating a tenant of the first service providing apparatus associated with a community to which the user is currently logged in, by the client terminal;

redirecting to the first service providing apparatus in a state in which the information indicating the tenant of the first service providing apparatus acquired in the first acquisition is included in a URL parameter, by the client terminal;

in a case where an authenticated access is received from the client terminal, acquiring an authentication session ID from the client terminal, by the first service providing apparatus;

acquiring as a second acquisition information indicating the tenant of the first service providing apparatus based on the authentication session ID, by the first service providing apparatus;

performing a first comparison between the information indicating the tenant of the first service providing apparatus acquired in the second acquisition, and the information indicating the tenant of the first service providing apparatus included in the URL parameter of the client terminal, by the first service providing apparatus;

in a case where the information indicating the tenant of the first service providing apparatus acquired in the second acquisition and the information indicating the tenant of the first service providing apparatus included in the URL parameter match with each other in the first comparison, providing the service by the first service providing apparatus;

in a case where the information indicating the tenant of the first service providing apparatus acquired in the second acquisition and the information indicating the tenant of the first service providing apparatus included in the URL parameter do not match with each other in the first comparison, performing a second comparison by the first service providing apparatus, wherein the second comparison is between the information indicating the tenant of the first service providing apparatus included in the URL parameter, and information indicating the tenant of the first service providing apparatus included in a cookie;

in a case where the information indicating the tenant of the first service providing apparatus included in the URL parameter and the information indicating the tenant of the first service providing apparatus included in the cookie match with each other in the second comparison, providing the service by the first service providing apparatus; and in a case where the information indicating the tenant of the first service providing apparatus included in the URL parameter and the information indicating the tenant of the first service providing apparatus included in the cookie do not match with each other in the second comparison, returning an error screen to the client terminal, by the first service providing apparatus, wherein a community, to which the user to receive the service by the second service providing apparatus belongs, is changeable by the client terminal.

7. A non-transitory computer-readable storage medium storing a program for causing a computer to perform a control method for a system including a client terminal, a first service providing apparatus, and a second service providing apparatus, in which the first service providing apparatus and the second service providing apparatus cooperate with each other based on single sign-on and a service is provided to the client terminal, the control method comprising:

managing a tenant of the first service providing apparatus in association with a community created as a subordinate group of a tenant of the second service providing apparatus, by the second service providing apparatus;

acquiring, from the second service providing apparatus, as a first acquisition, in response to a user, who has received a service provided by the second service providing apparatus, issuing an instruction for requesting provision of a service by the first service providing apparatus, information indicating a tenant of the first service providing apparatus associated with a community to which the user is currently logged in, by the client terminal;

redirecting to the first service providing apparatus in a state in which the information indicating the tenant of the first service providing apparatus acquired in the first acquisition is included in a URL parameter, by the client terminal;

in a case where an authenticated access is received from the client terminal, acquiring an authentication session ID from the client terminal, by the first service providing apparatus;

acquiring as a second acquisition information indicating the tenant of the first service providing apparatus based on the authentication session ID, by the first service providing apparatus;

performing a first comparison between the information indicating the tenant of the first service providing apparatus acquired in the second acquisition, and the information indicating the tenant of the first service providing apparatus included in the URL parameter of the client terminal, by the first service providing apparatus;

in a case where the information indicating the tenant of the first service providing apparatus acquired in the second acquisition and the information indicating the tenant of the first service providing apparatus included in the URL parameter match with each other in the first comparison, providing the service by the first service providing apparatus;

in a case where the information indicating the tenant of the first service providing apparatus acquired in the second acquisition and the information indicating the tenant of the first service providing apparatus included in the URL parameter do not match with each other in the first comparison, performing a second comparison by the first service providing apparatus, wherein the second comparison is between the information indicating the tenant of the first service providing apparatus included in the URL parameter, and information indicating the tenant of the first service providing apparatus included in a cookie;

in a case where the information indicating the tenant of the first service providing apparatus included in the URL parameter and the information indicating the tenant of the first service providing apparatus included in the cookie match with each other in the second comparison, providing the service by the first service providing apparatus; and in a case where the information indicating the tenant of the first service providing apparatus included in the URL parameter and the information indicating the tenant of the first service providing apparatus included in the cookie do not match with each other in the second comparison, returning an error screen to the client terminal, by the first service providing apparatus, wherein a community, to which the user to receive the service by the second service providing apparatus belongs, is changeable by the client terminal.

* * * * *